US012300478B2

(12) United States Patent
Cox et al.

(10) Patent No.: US 12,300,478 B2
(45) Date of Patent: May 13, 2025

(54) SIMPLIFICATION OF METHOD OR SYSTEM USING SCOUT MRM

(71) Applicant: DH TECHNOLOGIES DEVELOPMENT PTE. LTD., Singapore (SG)

(72) Inventors: David M. Cox, Toronto (CA); Chang Liu, Richmond Hill (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 359 days.

(21) Appl. No.: 17/999,569

(22) PCT Filed: May 21, 2021

(86) PCT No.: PCT/IB2021/054403

§ 371 (c)(1),
(2) Date: Nov. 22, 2022

(87) PCT Pub. No.: WO2021/234646

PCT Pub. Date: Nov. 25, 2021

(65) Prior Publication Data

US 2023/0230825 A1 Jul. 20, 2023

Related U.S. Application Data

(60) Provisional application No. 63/029,226, filed on May 22, 2020.

(51) Int. Cl.

*H01J 49/00* (2006.01)
*H01J 49/04* (2006.01)
*H01J 49/16* (2006.01)

(52) U.S. Cl.

CPC ...... *H01J 49/0081* (2013.01); *H01J 49/0454* (2013.01); *H01J 49/0404* (2013.01); *H01J 49/164* (2013.01)

(58) Field of Classification Search

CPC ............... H01J 49/0081; H01J 49/0454; H01J 49/0404; H01J 49/164
See application file for complete search history.

(56) References Cited

U.S. PATENT DOCUMENTS

2019/0157060 A1* 5/2019 Datwani ............. H01J 49/0454
2020/0132696 A1* 4/2020 Hembrough ....... G01N 33/6851
2021/0116468 A1* 4/2021 Sugimoto ................. G06F 3/16

FOREIGN PATENT DOCUMENTS

WO 2017093861 A1 6/2017

OTHER PUBLICATIONS

International Search Report and Written Opinion for PCT/IB2021/054403, mailed Aug. 5, 2021.

* cited by examiner

*Primary Examiner* — Nicole M Ippolito
(74) *Attorney, Agent, or Firm* — Potomac Law Group, PLLC; Reza Mollaaghababa; Ido Rabinovitch

(57) ABSTRACT

Each sample of a series of samples is ejected at an ejection time and according to a sample order. Each ejected sample of the series is ionized, producing ion beam. A list of different sets of MRM transitions is received. Each set of the list corresponds to a different sample. A group of one or more different sets is selected from the list. Initially, each set selected for the group corresponds to a different sample of one or more first samples of the series. A mass spectrometer is instructed to execute each transition of each set of the group on the ion beam until a transition of a set of the group is detected, upon which, one or more next sets are selected from the list to be monitored using the set of the detected transition and the sample order.

15 Claims, 16 Drawing Sheets

SIMPLIFICATION OF METHOD OR SYSTEM USING SCOUT MRM

RELATED US APPLICATIONS

This application claims the benefit of priority from U.S. Provisional Application No. 63/029,226, filed on May 22, 2020, the entire contents of which is incorporated by reference herein.

INTRODUCTION

The teachings herein relate to operating a sample introduction system and a mass spectrometer to mass analyze a series of samples using multiple reaction monitoring (MRM) transitions. More specifically, systems and methods are provided to select the next MRM transitions to be monitored in a high-throughput sample introduction coupled mass spectrometry experiment based on the transition detected and the order in which the samples are ejected.

Sample Timing Problem

As described below, an acoustic droplet ejection (ADE) device can be used to deliver samples rapidly to an open port interface (OPI), which, in turn, transfers an analyte through a transfer tube to a mass spectrometer, where the analyte is analyzed. This method of sample analysis is referred to as acoustic ejection mass spectrometry (AEMS). In AEMS, there is a delay from when the acoustic ejection occurs to when the signal from the analyte is detected (several seconds). There is also variability in how long it takes analytes to travel from the acoustic ejection to the entrance of the mass spectrometer.

When using an OPI in AEMS at high-speed ejection rates (1 sample every second), there are multiple samples traveling within the transfer tube. When identifying which detected signal belongs to which sample, it is extremely important to detect the very first sample. If the signal for the first sample is missing or misidentified, there is a risk that the signal from the second sample is identified as the signal from the first sample, and then all the analyses of samples thereafter are incorrect.

Reasons for why the first sample may not be detected can include, but are not limited to, a user not adding analyte to a well, the ADE device firing but the droplet not entering the OPI due to static charge, asymmetrical sample surface meniscus or misalignment, or the sample well containing air bubbles that prevent the proper ejection of a droplet. Although the occurrence of missing a signal from a sample might be rare, the consequences of it happening are severe (e.g., incorrect data).

AEMS presents some unique challenges for acquiring data. Even though it can deliver samples from distinct sample wells to a detector of a mass spectrometer at a rate of more than one per second, the exact time that the sample arrives at the detector is difficult to calculate ahead of time. For example, it can vary due to how long the ADE device takes to fire droplets (finding the center of a well and finding correct acoustic parameters can vary by tens to hundreds of milliseconds per well). As described above, the exact time a sample arrives at the detector can also vary due to changes in the flow through the transfer line of the OPI.

For assays that require different detector settings per sample well, it can be challenging to get the timing of changing these settings correct. MRM assays, for example, require different MRM transitions and, therefore, different settings per sample well. Scheduled MRM is one solution to measuring a different MRM transition per well, but it conventionally requires an upfront calculation of when the MRM should be changed. Increasing the number of MRM transitions to be monitored simultaneously can also expand the tolerance to the time setting. However, the dwell time and, therefore, the number of points acquired across an intensity versus time mass peak are sacrificed due to the sharp peak shape created by AEMS.

As a result, additional systems and methods are needed to reduce the number of MRM transitions monitored at any one time in an AEMS experiment in order to increase the number of measurements that can be made across an intensity versus time mass peak.

ADE and OPI Background

Accurate determination of the presence, identity, concentration, and/or quantity of an analyte in a sample is critically important in many fields. Many techniques used in such analyses involve ionization of species in a fluid sample prior to introduction into the analytical equipment employed. The choice of ionization method will depend on the nature of the sample and the analytical technique used, and many ionization methods are available. Examples of ionization methods include for example Electrospray Ionization (ESI), Matrix-Assisted Laser Desorption Ionization (MALDI), Desorption Electrospray Ionization (DESI) and laser diode thermal desorption (LDTD). Mass spectrometry is a well-established analytical technique in which sample molecules are ionized and the resulting ions are then sorted by mass-to-charge ratio.

The ability to couple mass spectrometric analysis, particularly electrospray mass spectrometric analysis, to separation techniques, such as liquid chromatography (LC), including high-performance liquid chromatography (HPLC), capillary electrophoresis, or capillary electrochromatography, has meant that complex mixtures can be separated and characterized in a single process. Improvements in HPLC system design, such as reductions in dead volumes and an increase in pumping pressure, have enabled the benefits of smaller columns containing smaller particles, improved separation, and faster run time to be realized. Despite these improvements, the time required for sample separation is still around one minute. Even if real separation is not required, the mechanics of loading samples into the mass spectrometer still limit sample loading time to about ten seconds per sample using conventional autosamplers with some level of cleanup between injections.

There has been some success in improving throughput performance. Simplifying sample processing by using solid-phase extraction, rather than traditional chromatography, to remove salts can reduce pre-injection times to under ten seconds per sample from the minutes per sample required for HPLC. However, the increase in sampling speed comes at the cost of sensitivity. Furthermore, the time saved by the increase in sampling speed is offset by the need for cleanup between samples.

Another limitation of current mass spectrometer loading processes is the problem of carryover between samples, which necessitates a cleaning step after each sample is loaded to avoid contamination of a subsequent sample with a residual amount of analyte in the prior sample. This requires time and adds a step to the process, complicating rather than streamlining the analysis with conventional autosampler systems.

Additional limitations of current mass spectrometers when used to process complex samples, such as biological fluids, are unwanted "matrix effects," phenomena that result from the presence of matrix components (e.g., natural matrix components such as cellular matrix components, or contaminants inherent in some materials such as plastics) and adversely affect detection capability, precision, and/or accuracy for the analyte of interest.

Several of the aforementioned limitations have been addressed by using acoustic mist ionization (AMI). See Sinclair et al. (2016) Journal of Laboratory Automation 21(1):19-26 and U.S. Pat. No. 7,405,395 to Ellson et al. (Labcyte Inc., San Jose, Calif.), both of which are incorporated by reference in their entireties. Unfortunately, as noted by Sinclair et al., potential matrix effects can still be problematic. Additionally, for applications in which a consistent droplet size is necessary or desirable, the acoustic mist approach is less than ideal, insofar as droplets with different sizes are generated by a single acoustic burst.

In acoustic droplet ejection (ADE), each ejection is a single well-controlled nanoliter drop, while in AMI, each ejection generates a plume of mist. Another difference between AEMS and AMI includes the type of sample transfer from the acoustic device to the mass spectrometer. AEMS uses liquid phase transfer to electrospray ion source (ESI), while AMI uses a heat tube to transfer the sample mists to the MS in a gas phase transfer.

In order to overcome the limitations found in using AMI or ADE to deliver small amounts of a fluid sample from individual microtiter plate wells to a mass spectrometer or other analytical devices, a system was developed combining ADE with an open port interface (OPI) for high-throughput mass spectrometry. This system is described in U.S. patent application Ser. No. 16/198,667 (hereinafter the "'667 applications"), which is incorporated herein in its entirety.

FIG. 1A is an exemplary system combining ADE with an OPI, as described in the '667 applications. In FIG. 1A, the ADE device is shown generally at 11, ejecting droplet 49 toward the continuous flow OPI indicated generally at 51 and into the sampling tip 53 thereof.

ADE device 11 includes at least one reservoir, with a first reservoir shown at 13 and an optional second reservoir 31. In some embodiments, a further plurality of reservoirs may be provided. Each reservoir is configured to house a fluid sample having a fluid surface, e.g., a first fluid sample 14 and a second fluid sample 16 having fluid surfaces respectively indicated at 17 and 19. The fluid samples 14 and 16 may be the same or different, but are generally different, insofar as they will ordinarily contain two different analytes intended to be transported to and detected in an analytical instrument (not shown). The analyte may be a biomolecule or a macromolecule other than a biomolecule, or it may be a small organic molecule, an inorganic compound, an ionized atom, or any moiety of any size, shape, or molecular structure, as explained earlier in this section. In addition, the analyte may be dissolved, suspended or dispersed in the liquid component of the fluid sample.

When more than one reservoir is used, as illustrated in FIG. 1A, the reservoirs are preferably both substantially identical and substantially acoustically indistinguishable, although identical construction is not a requirement. As explained earlier in this section, the reservoirs may be separate removable components in a tray, rack, or other such structure, but they may also be fixed within a plate, e.g., a well plate, or another substrate. Each reservoir is preferably substantially axially symmetric, as shown, having vertical walls 21 and 23 extending upward from circular reservoir bases 25 and 27, and terminating at openings 29 and 31, respectively, although other reservoir shapes and reservoir base shapes may be used. For example, the walls of the reservoir may be angled/tapered such that a larger volume is present towards the upper portion of the reservoir. The material and thickness of each reservoir base should be such that acoustic radiation may be transmitted therethrough and into the fluid sample contained within each reservoir.

ADE device 11 comprises acoustic ejector 33, which includes acoustic radiation generator 35 and focusing means 37 for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13. The system may contain a single acoustic ejector, as illustrated in FIG. 1A, or, as noted previously, it may contain multiple ejectors.

In operation, reservoir 13 and optional reservoir 15 of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53.

The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. A multi-well plate can include, but is not limited to, a 24 well, a 384 well, or a 1536 well plate.

Fluid samples 14 and 16 are samples of any fluid for which transfer to an analytical instrument is desired. Accordingly, the fluid sample may contain a solid that is minimally, partially or fully solvated, dispersed, or suspended in a liquid, which may be an aqueous liquid or a nonaqueous liquid. The structure of OPI 51 is also shown in FIG. 1A. Any number of commercially available continuous flow OPIs can be used as is or in modified form, all of which, as is well known in the art, operate according to substantially the same principles. As can be seen in FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13.

The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow into the solvent transport capillary and thus the rate of solvent flow within the solvent transport capillary 59 as well.

Fluid flow within the probe 53 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to control the output rate from outlet 63.

In one embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67.

In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas. In various embodiments, sample outlet 63 is a straight pipe protruding out of a gas nozzle.

The solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59. The dimensions of the inner capillary tube 73 can be from 1 micron to 1 mm, e.g., 200 microns. Typical dimensions of the outer diameter of the inner capillary tube 73 can be from 100 microns to 3 or 4 centimeters, e.g., 360 microns. Typical dimensions of the inner diameter of the outer capillary tube 71 can be from 100 microns to 3 or 4 centimeters, e.g., 450 microns. Typical dimensions of an outer diameter of the outer capillary tube 71 can be from 150 microns to 3 or 4 centimeters, e.g., 950 microns. The cross-sectional areas of the inner capillary tube 73 and/or the outer capillary tube 71 can be circular, elliptical, superelliptical (i.e., shaped like a superellipse), or even polygonal. While the illustrated system in FIG. 1A indicates the direction of solvent flow as downward from the solvent inlet 57 toward sampling tip 53 in the solvent transport capillary 59 and the direction of the analyte-solvent dilution flow as upward from the sampling tip 53 upward through the sample transport capillary 61 toward outlet 63, the directions can be reversed, and the OPI 51 is not necessarily positioned to be exactly vertical. Various modifications to the structure shown in FIG. 1A will be apparent to those of ordinary skill in the art, or may be deduced by those of ordinary skill in the art during use of the system.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the OPI 51, and the inner and outer capillary tubes 73, 71 can be arranged coaxially around a longitudinal axis of the OPI 51, as shown in FIG. 1.

Optionally, prior to use, the adjuster 75 is used to draw the inner capillary tube 73 longitudinally inward so that the outer capillary tube 71 protrudes beyond the end of the inner capillary tube 73, so as to facilitate optimal fluid communication between the solvent flow in the solvent transport capillary 59 and the sample transported as an analyte-solvent dilution flow 61 in the sample transport capillary 61. Additionally, as illustrated in FIG. 1A, the OPI 51 is generally affixed within an approximately cylindrical holder 81, for stability and ease of handling.

FIG. 1B is an exemplary system 110 for ionizing and mass analyzing analytes received within an open end of a sampling OPI, as described in the '667 applications. System 110 includes acoustic droplet injection device 11 configured to inject a droplet 49 from a reservoir into the open end of sampling OPI 51. As shown in FIG. 1B, the exemplary system 110 generally includes a sampling OPI 51 in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling OPI 51 and from the sampling OPI 51 to the ion source 160. For example, as shown in FIG. 1B, the solvent reservoir 150 (e.g., containing a liquid, desorption solvent) can be fluidly coupled to the sampling OPI 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 51 occurs within a sample space accessible at the open end such that one or more droplets 49 can be introduced into the liquid boundary 50 at the sample tip and subsequently delivered to the ion source 160.

As shown, the system 110 includes an acoustic droplet injection device 11 that is configured to generate acoustic energy that is applied to a liquid contained within a reservoir (as depicted in FIG. 1A) that causes one or more droplets 49 to be ejected from the reservoir into the open end of the sampling OPI 51. A controller 180 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling OPI 51 or otherwise discussed herein substantially continuously or for selected portions of an experimental protocol by way of non-limiting example. Controller 180 can be, but is not limited to, a microcontroller, a computer, a microprocessor, the computer system of FIG. 1, or any device capable of sending and receiving control signals and data.

As shown in FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by 114*b* and 116*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163).

It will be appreciated that the flow rate of the nebulizer gas can be adjusted (e.g., under the influence of controller 180) such that the flow rate of liquid within the sampling OPI 51 can be adjusted based, for example, on suction/aspiration force generated by the interaction of the nebulizer gas and the analyte-solvent dilution as it is being discharged from the electrospray electrode 164 (e.g., due to the Venturi effect).

As shown in FIG. 1B, the ionization chamber 112 can be maintained at atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114*a* having a curtain plate aperture 114*b*. As shown, a vacuum chamber 116, which houses the mass analyzer 170, is separated from the curtain chamber 114 by a plate 116*a* having a vacuum chamber sampling orifice 116*b*. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions which pass through the analyzer 170 and can, for example, supply a signal indicative of the number of ions per second that are detected.

Mass Spectrometry Background

Mass spectrometers are often coupled with chromatography or other sample introduction systems, such as an ADE device and OPI, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, $MS/MS^{ALL}$. In an $MS/MS^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the $MS/MS^{ALL}$ method, all the precursor ions in each precursor ion mass selection window are fragmented, and all of the product ions of all of the precursor ions in each mass selection window are mass analyzed.

SUMMARY

A system, method, and computer program product are disclosed for selecting the next MRM transitions to be monitored in a high-throughput sample introduction coupled mass spectrometry experiment based on the transition detected and the order of the samples. The system includes a sample introduction system, a mass spectrometer, and a processor.

The sample introduction system ejects each sample of a series of samples at an ejection time and according to a sample order. A plurality of ejection times corresponding to the series of samples is produced. The sample introduction system also ionizes each ejected sample of the series of samples, producing an ion beam. The mass spectrometer receives the ion beam.

The processor receives a list of different sets of one or more MRM precursor ion to product ion transitions. Each set of the list corresponds to a different sample of the series of samples. The processor a group of one or more sets from the list. Initially, each set transition selected for the group corresponds to a different sample each set selected for the group corresponds to a different sample of one or more first samples of the series of samples.

The processor instructs the tandem mass spectrometer to execute each transition of each set of the group on the ion beam during each cycle of a plurality of cycles until a transition of a set of the group is detected. When a transition of a set of the group is detected, the processor selects one or more next sets from the list to be monitored using the detected transition and the sample order of the series samples.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1A:
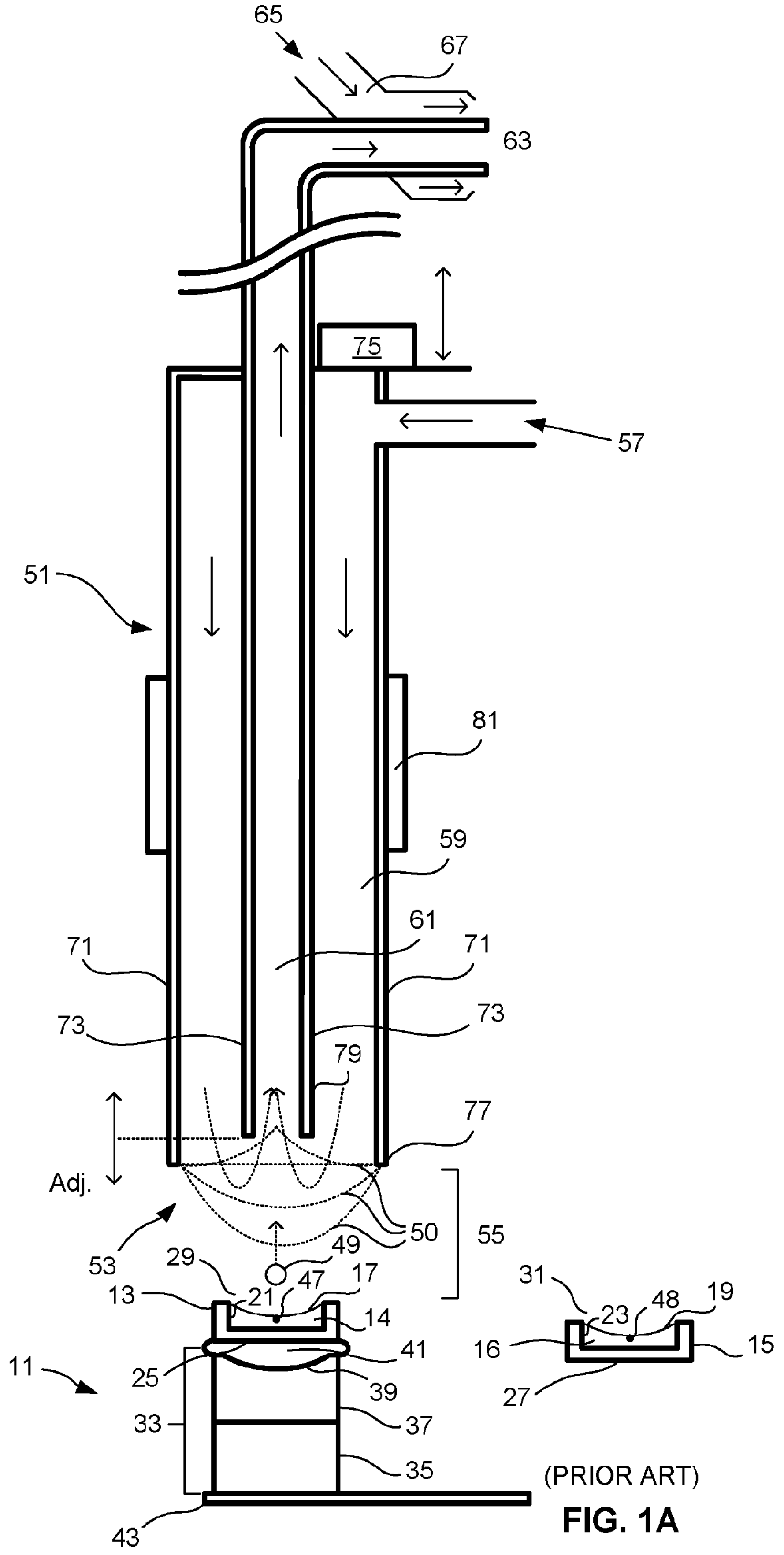
(PRIOR ART) FIG. 1A
FIG. 1A is an exemplary system combining an acoustic droplet ejection (ADE) with an open port interface (OPI) sampling interface, as described in the '667 applications.
Figure 1B:
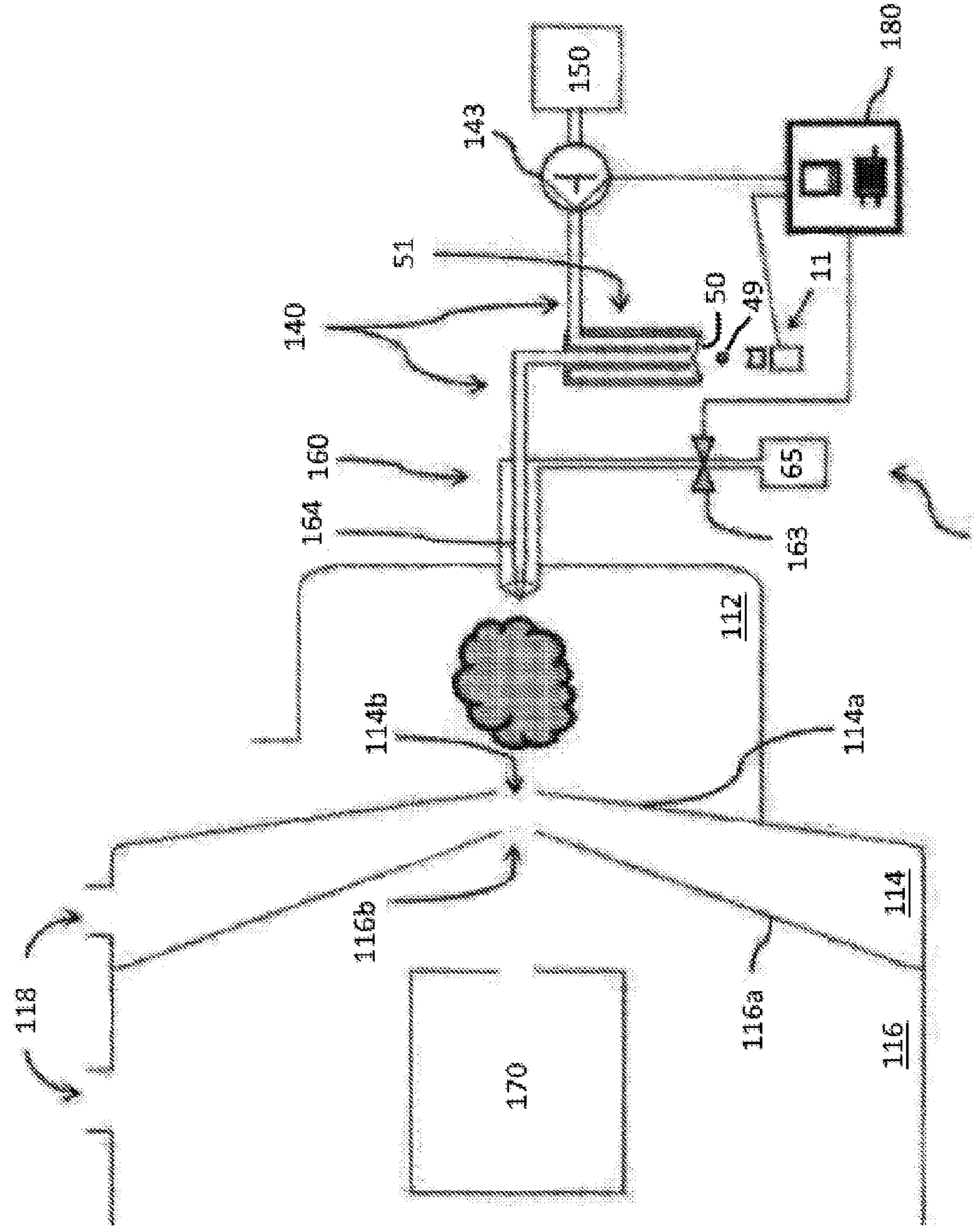
FIG. 1B (PRIOR ART)
FIG. 1B is an exemplary system for ionizing and mass analyzing analytes received within an open end of a sampling OPI, as described in the '667 applications.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 2:
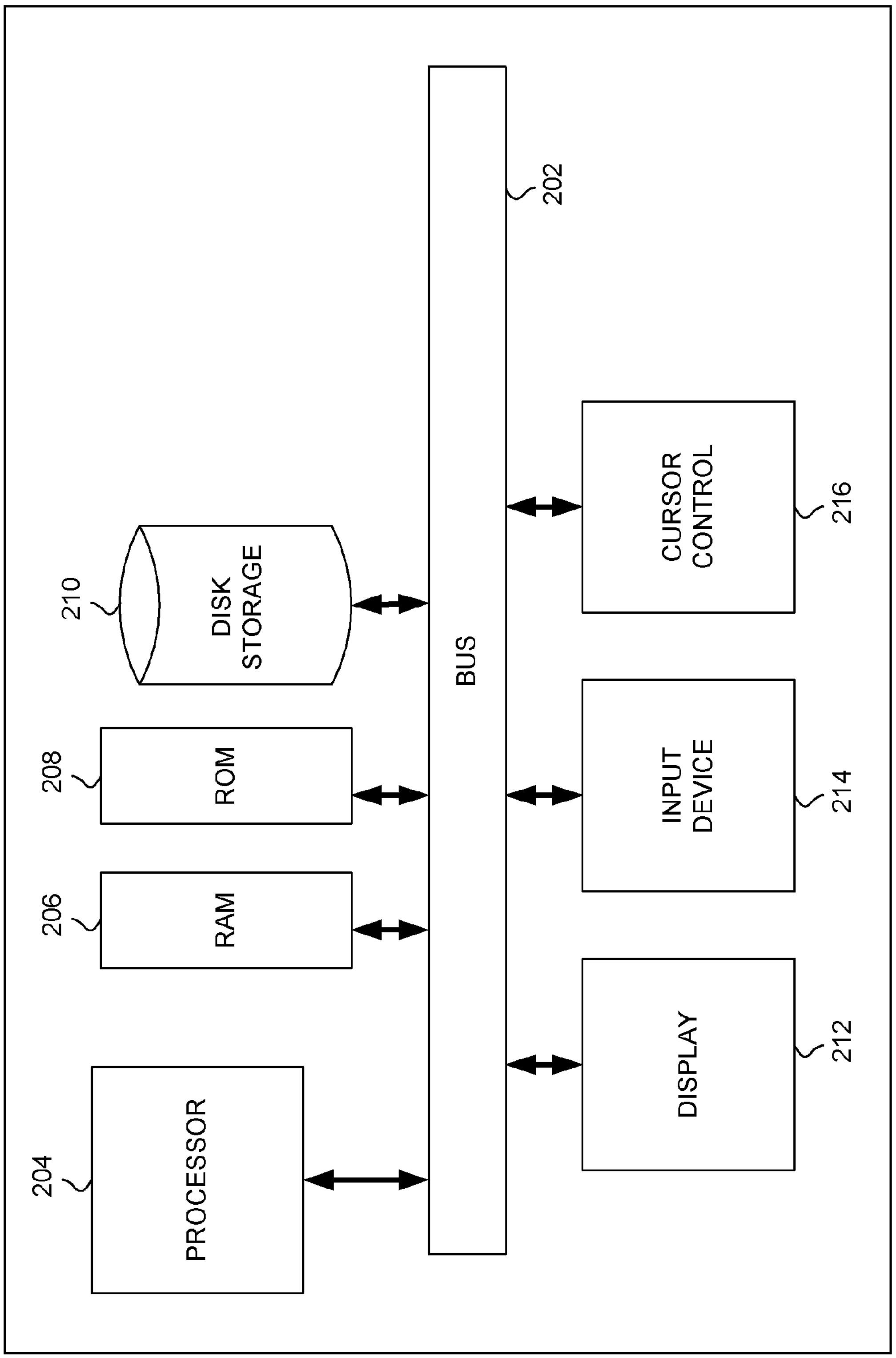
FIG. 2 is a block diagram that illustrates a computer system, upon which embodiments of the present teachings may be implemented.

FIG. 2 is a block diagram that illustrates a computer system 200, upon which embodiments of the present teachings may be implemented. Computer system 200 includes a bus 202 or other communication mechanism for communicating information, and a processor 204 coupled with bus 202 for processing information. Computer system 200 also includes a memory 206, which can be a random-access memory (RAM) or other dynamic storage device, coupled to bus 202 for storing instructions to be executed by processor 204. Memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (i.e., x) and a second axis (i.e., y), that allows the device to specify positions in a plane.

A computer system 200 can perform the present teachings. Consistent with certain implementations of the present teachings, results are provided by computer system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 200 can be connected to one or more other computer systems, like computer system 200, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 204 for execution. For example, the instructions may initially be carried on the magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Selecting the Next MRM Transitions Based on Sample Order

As described above, AEMS systems can eject samples at high-speed ejection rates (1 sample every second). However, in AEMS, there is a delay from when the acoustic ejection occurs to when the signal from the analyte is detected (several seconds). Even though an AEMS system can deliver samples from distinct sample wells to a detector of a mass spectrometer at a rate of more than one per second, the exact time that the sample arrives at the detector is difficult to calculate ahead of time.

For MRM assays that require different mass spectrometer/detector settings per sample well, it can be challenging to get the timing of changing these settings correct. Scheduled MRM is one solution to switch between different MRM transition per well, but it conventionally requires an upfront calculation of when the MRM should be changed. Increasing the number of MRM transitions to be monitored simultaneously can also expand the tolerance to the time setting. However, the dwell time and, therefore, the number of points acquired across an intensity versus time mass peak are sacrificed due to the sharp peak shape created by AEMS.

As a result, additional systems and methods are needed to reduce the number of MRM transitions monitored at any one time in an AEMS experiment in order to increase the number of measurements that can be made across an intensity versus time mass peak.

FIGS. 3-6 illustrate how not being able to calculate in advance the delay time from when an acoustic ejection occurs to when a signal from an analyte is detected in AEMS affects the alignment of MS measurements with samples.

Figure 3:
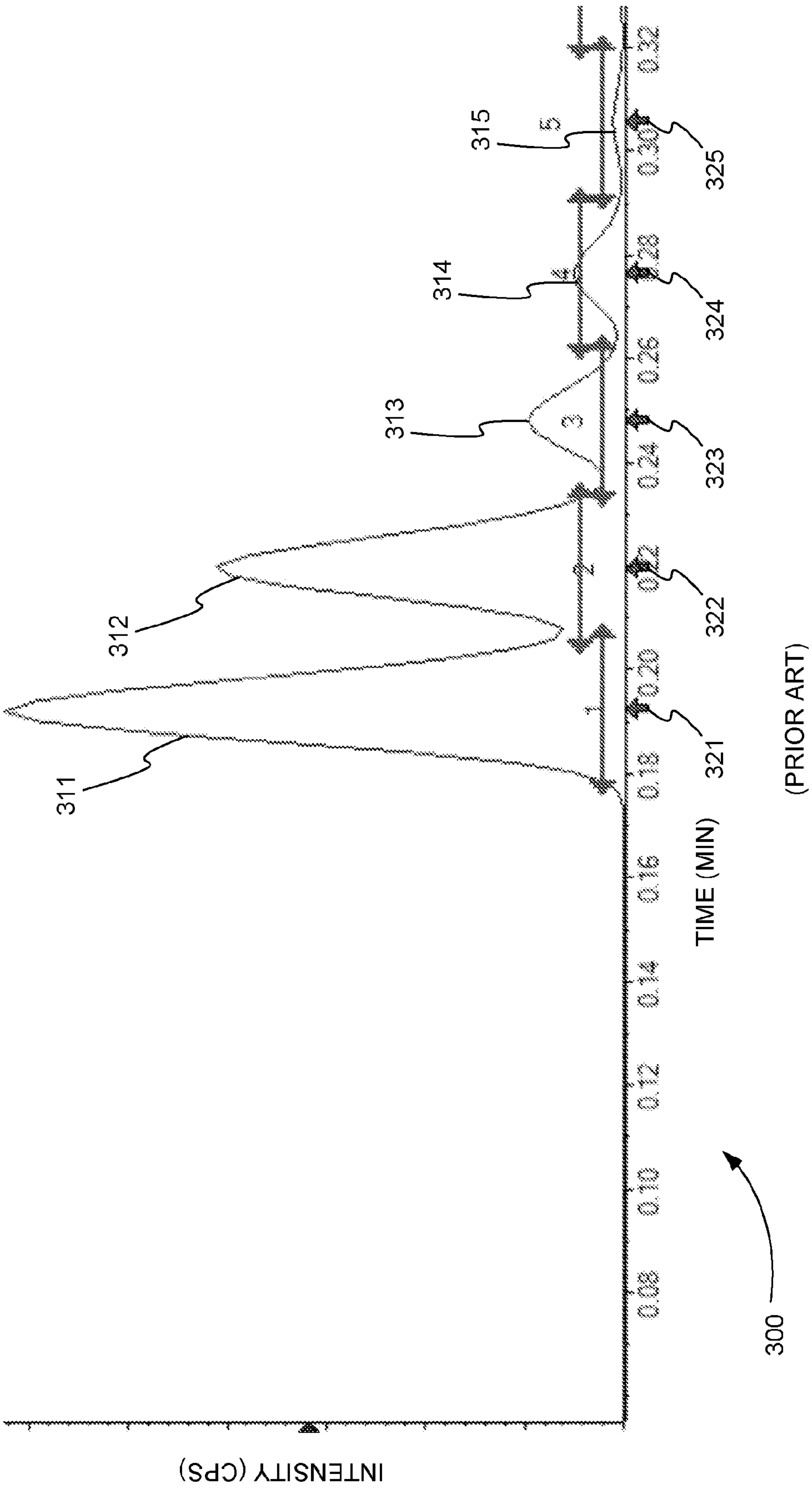
(PRIOR ART) FIG. 3
FIG. 3 is an exemplary plot showing the proper alignment of detected peaks with ejection times from an ADE device timing file.

FIG. 3 is an exemplary plot 300 showing the proper alignment of detected peaks with ejection times from an ADE device timing file. In plot 300, for example, intensity versus time peaks 311, 312, 313, 314, and 315 are properly aligned with ejection times depicted by arrows 321, 322, 323, 324 and 325, respectively.

However, if some peaks, particularly the first one or more peaks, are missing, this alignment may be confounded.

Figure 4:
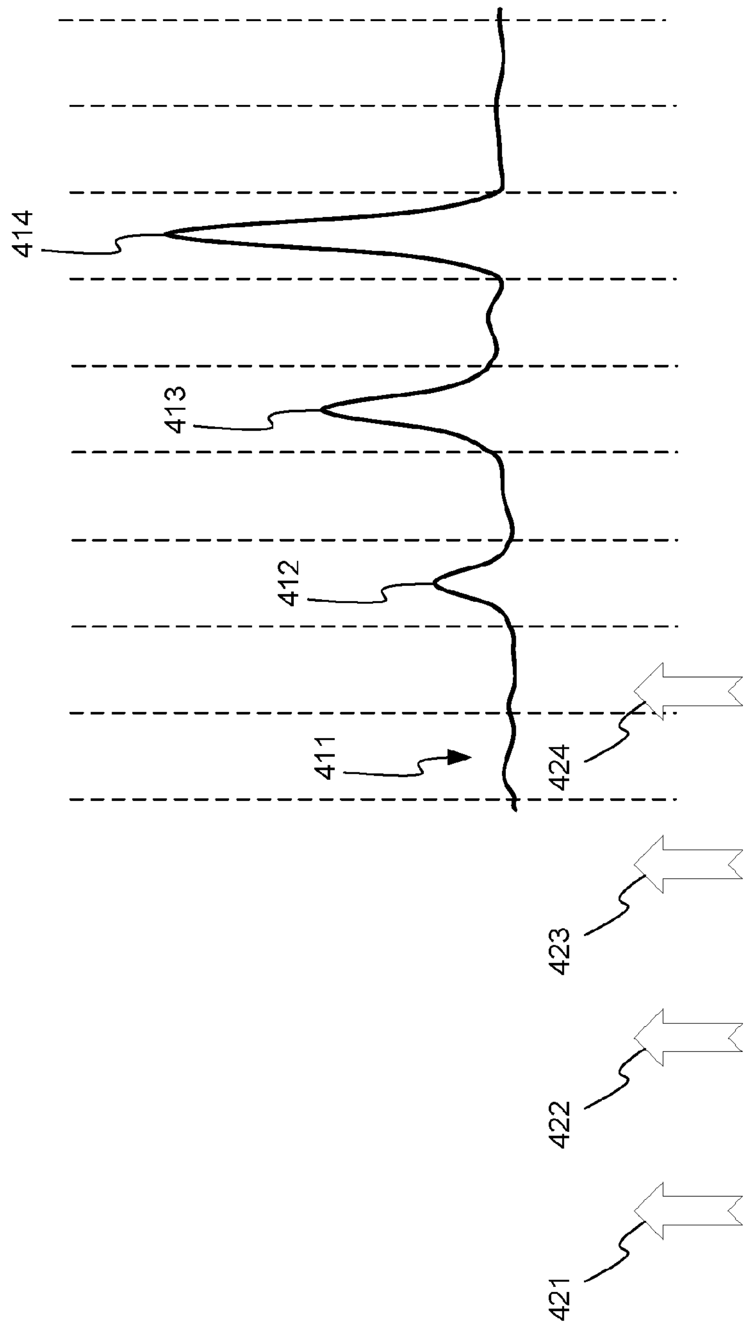
(PRIOR ART) FIG. 4
FIG. 4 is an exemplary plot showing three peaks detected over time by a mass spectrometer for analytes from four different samples sequentially provided to the mass spectrometer by an ADE device and an OPI.

FIG. 4 is an exemplary plot 400 showing three peaks detected over time by a mass spectrometer for analytes from four different samples sequentially provided to the mass spectrometer by an ADE device and an OPI. In plot 400, intensity versus time peaks 412, 413, and 414 are detected by the mass spectrometer for three different samples ejected into the OPI by the ADE device. At time 411, a peak is missing for a fourth sample, which was the first sample that the ADE device attempted to eject into the OPI.

Arrows 421, 422, 423, and 424 show the ejection times of the four different samples relative to time peaks 412, 413, and 414. In other words, the position of arrows 421, 422, 423, and 424 relative to time peaks 412, 413, and 414 shows the time delay between sample ejection by the ADE device and sample analysis by the mass spectrometer. Plot 400 shows that, because of the time delay between sample ejection and analysis, arrows 421, 422, 423, and 424 must be aligned with peaks 412, 413, and 414 in order to determine the sample corresponding to each peak. The ejection times depicted by arrows 421, 422, 423, and 424 are stored in the timing file by the ADE device, for example.

Figure 5:
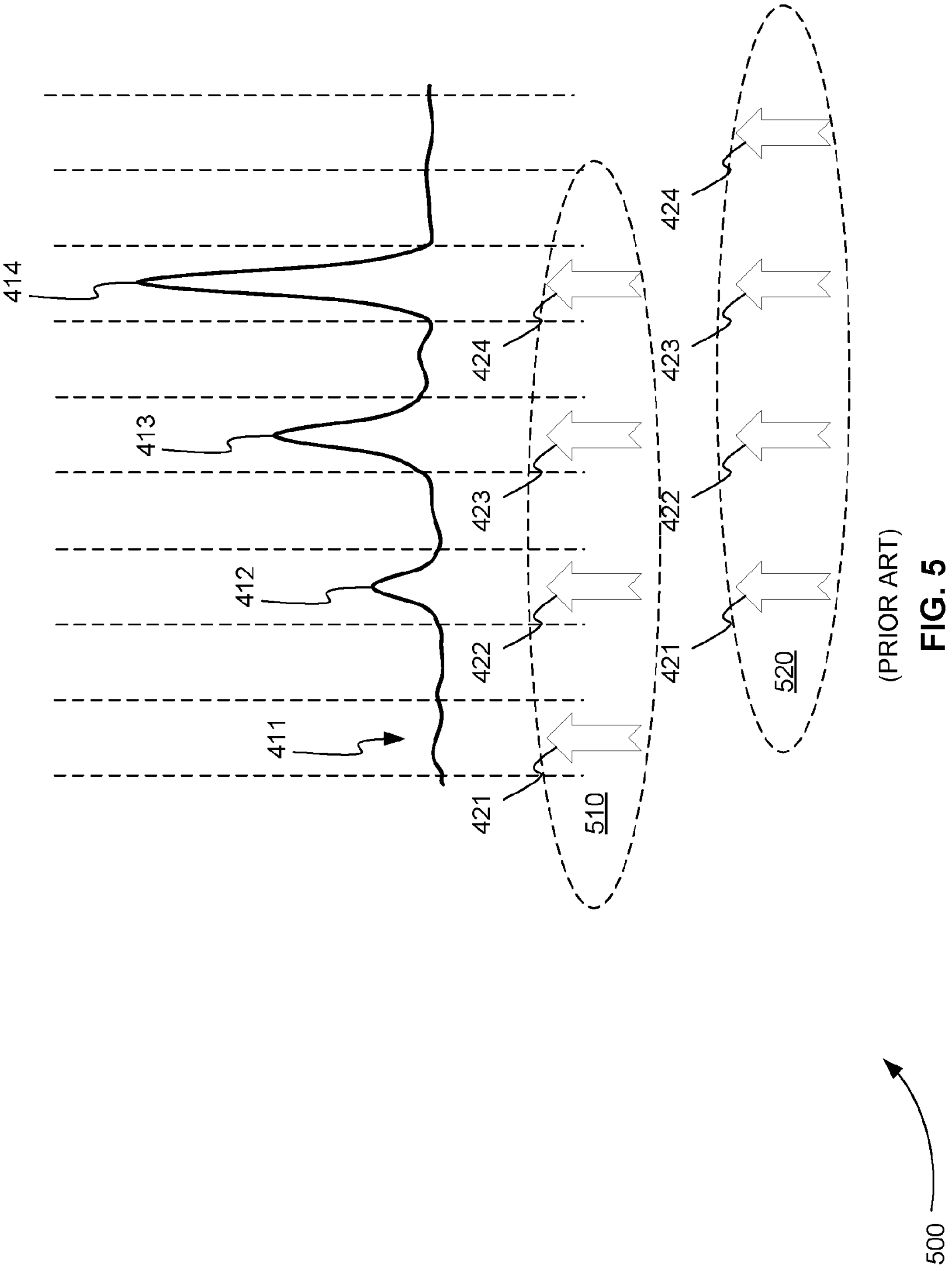
(PRIOR ART) FIG. 5
FIG. 5 is an exemplary plot showing how the mismatch in the number of peaks detected and the number of ejection times in FIG. 4 results in different alignments of the four different sample ejections with the three peaks of FIG. 4.

FIG. 5 is an exemplary plot 500 showing how the mismatch in the number of peaks detected and the number of ejection times in FIG. 4 results in different alignments of the four different sample ejections with the three peaks of FIG. 4. In alignment 510, ejection times depicted by arrows 422, 423, and 424 are aligned with peaks 412, 413, and 414, respectively. In alignment 520, however, ejection times depicted by arrows 421, 422, and 423 are aligned with peaks 412, 413, and 414, respectively. Both alignments are possible.

As a result, plot 500 shows that the determination of the samples corresponding to peaks 412, 413, and 414 is confounded by the missing peak at time 411. In other words, a missing peak at time 411 makes it difficult to determine the identity of peaks 412, 413, and 414, potentially resulting in incorrect results for the four samples and all samples following those four samples.

Figure 6:
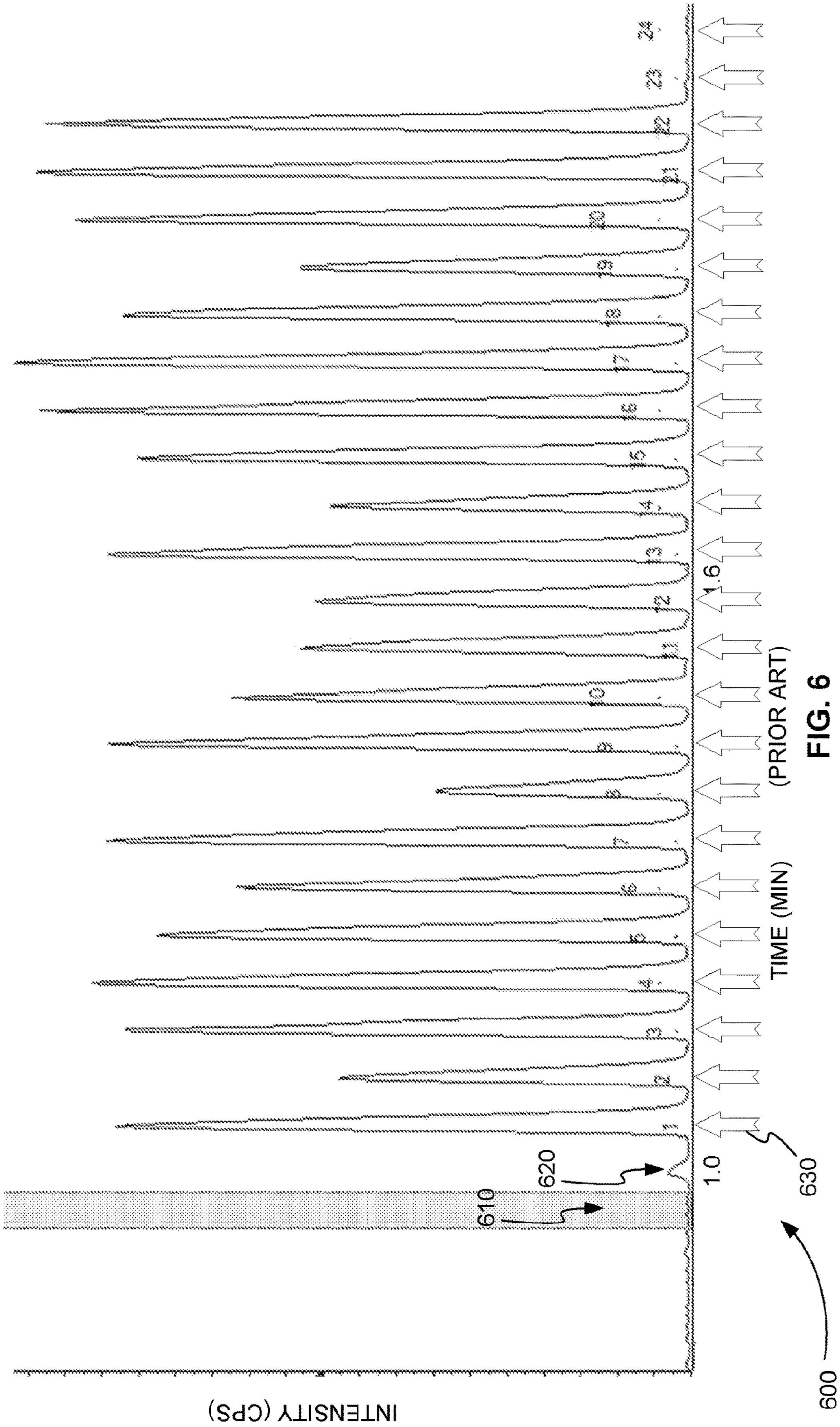
(PRIOR ART) FIG. 6
FIG. 6 is an exemplary plot showing detected peaks misaligned with ejection times due to a missing peak and a low-intensity peak.

FIG. 6 is an exemplary plot 600 showing detected peaks misaligned with ejection times due to a missing peak and a low-intensity peak. In plot 600, there is a missing peak at time 610 and there is a low-intensity peak at time 620 relative to the other peaks detected. As a result, the alignment of the ejection times represented by arrows 630 is off or shifted by two samples or wells. Consequently, the data reported for all 24 wells is incorrect due to the misalignment which leads to the incorrect MRM being measured for a given well.

FIGS. 4-6 show that additional AEMS systems and methods are needed to calculate the delay time from when an acoustic ejection occurs to when a signal from an analyte is detected in AEMS.

In various embodiments, the delay time from when an acoustic ejection occurs to when a signal from an analyte is detected is calculated in real-time using multiple reaction monitoring (MRM) transitions. More specifically, the next MRM transitions to be monitored in an AEMS experiment are selected in real-time based on the last transition detected and the order in which the samples are ejected. At least three different embodiments are possible for selecting the next MRM transitions to be monitored using the sample order.

In a first embodiment, each MRM transition corresponding to each sample ejected is a scout transition. A scout transition is a transition that identifies or triggers the next one or more transitions to be executed. In other words, a scout transition identifies additional transitions that should be monitored together.

Conventionally, MRM transitions have been triggered based on a retention time or retention time range. This is referred to as scheduled MRM. In order to make MRM methods less sensitive to changes in the retention time for compounds eluting from a liquid chromatography (LC) column, scout transitions were developed. Scout transitions simply require knowing what transitions should be turned on together rather than knowing the exact time of when a transition needs to be turned on.

AEMS experiments are very different from LC-MS experiments. There is no column. Compounds do not have an elution time. The samples come out of the transfer tube in the same order that they were acoustically injected into the OPI port. As a result, scout MRM transitions are well suited for use in AEMS experiments.

For example, since the samples come out in the same order they were injected in AEMS experiments, a scout transition A1 that is used to detect a compound of sample 1 can be used to turn on or trigger a scout transition A2 that is used to detect a compound of sample 2. Similarly, scout transition A2 can be used to trigger a scout transition A3 that is used to detect a compound of sample 3 and so forth. As a result, there is a rolling use of scout transitions.

As described above, however, some sample wells may be empty or the compounds of some sample wells may not be detected. Therefore, in various embodiments, a group of scout transitions is executed during each cycle of the mass spectrometer to handle missing samples. For example, a detection of scout transition A1 can trigger the addition of two or more transitions to the group, such as transitions A2, A3, and A4.

The detection of a scout transition can also trigger the removal of another scout transition from the group. For example, the detection of transition A2 results in the removal of transition A1 from the group. If for transition A2 a sample is missing from the sample well, then detection of transition A3 triggers the removal of both transition A1 and transition A2 from the group. Also, the detection of transition A3 triggers transitions A4, A5, and A6. If transition A4 is already a member of the group, then only transitions A5 and A6 are added to the group.

Figure 7:
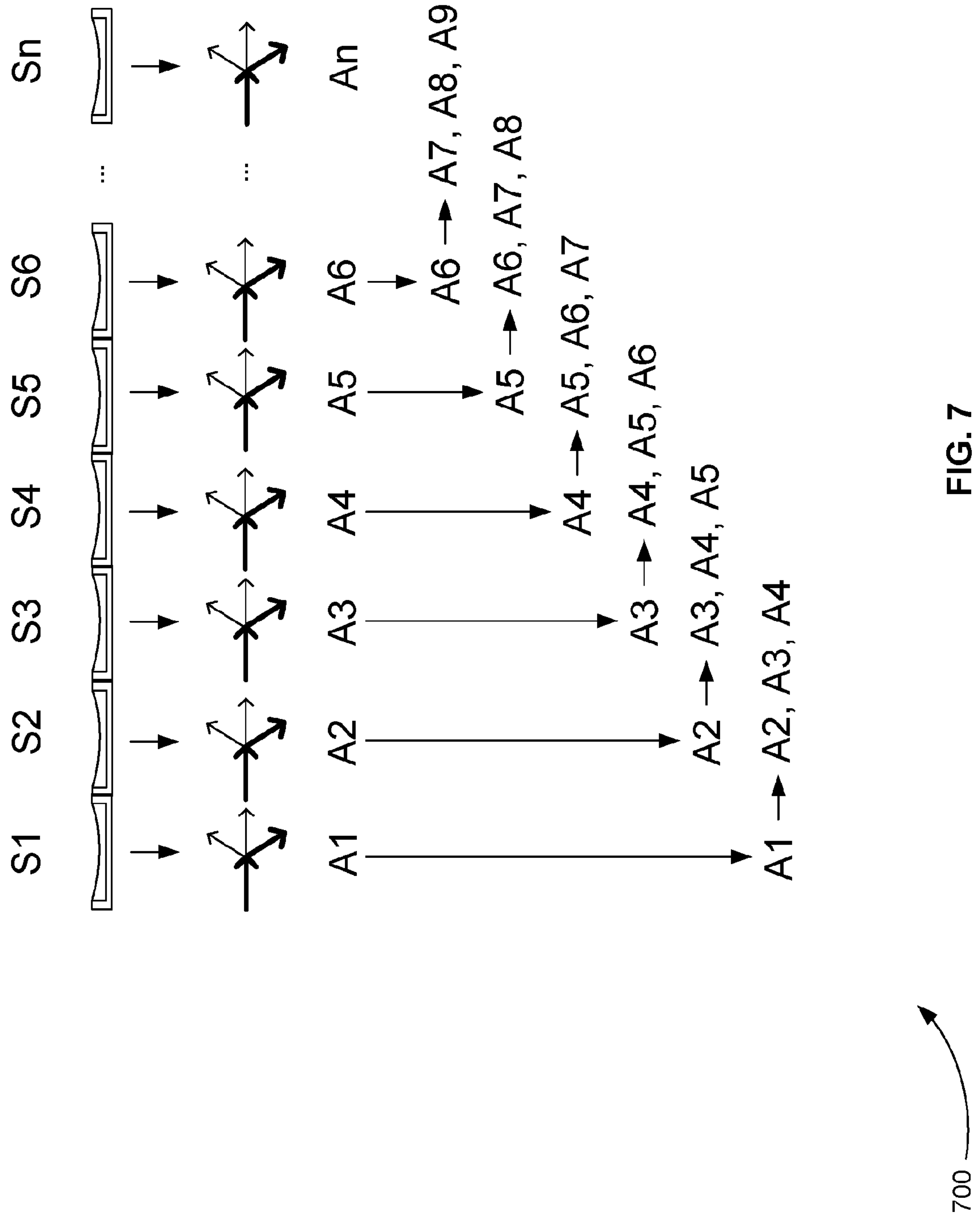
FIG. 7 is an exemplary diagram showing how n precursor ion to product ion MRM transitions correspond to n samples of an AEMS experiment, in accordance with various embodiments.

FIG. 7 is an exemplary diagram 700 showing how n precursor ion to product ion MRM transitions correspond to n samples of an AEMS experiment, in accordance with various embodiments. Specifically, transitions A1 to An correspond to samples S1 to Sn. In other words, transitions A1 to An are developed specifically to detect compounds in samples S1 to Sn, respectively. Each transition of transitions A1 to An is a scout transition and identifies three additional transitions to be triggered by the scout transition.

For example, if the product ion of transition A3 is detected above a certain intensity level, then transition A3 is detected. If transition A3 is detected, then transitions A4, A5, and A6 are triggered. Triggered means, for example, adding the identified transitions to the group of transitions being executed. Also, the detection of transition A3 can trigger the removal of all transitions preceding A3 from the group of transitions being executed.

Figure 8:
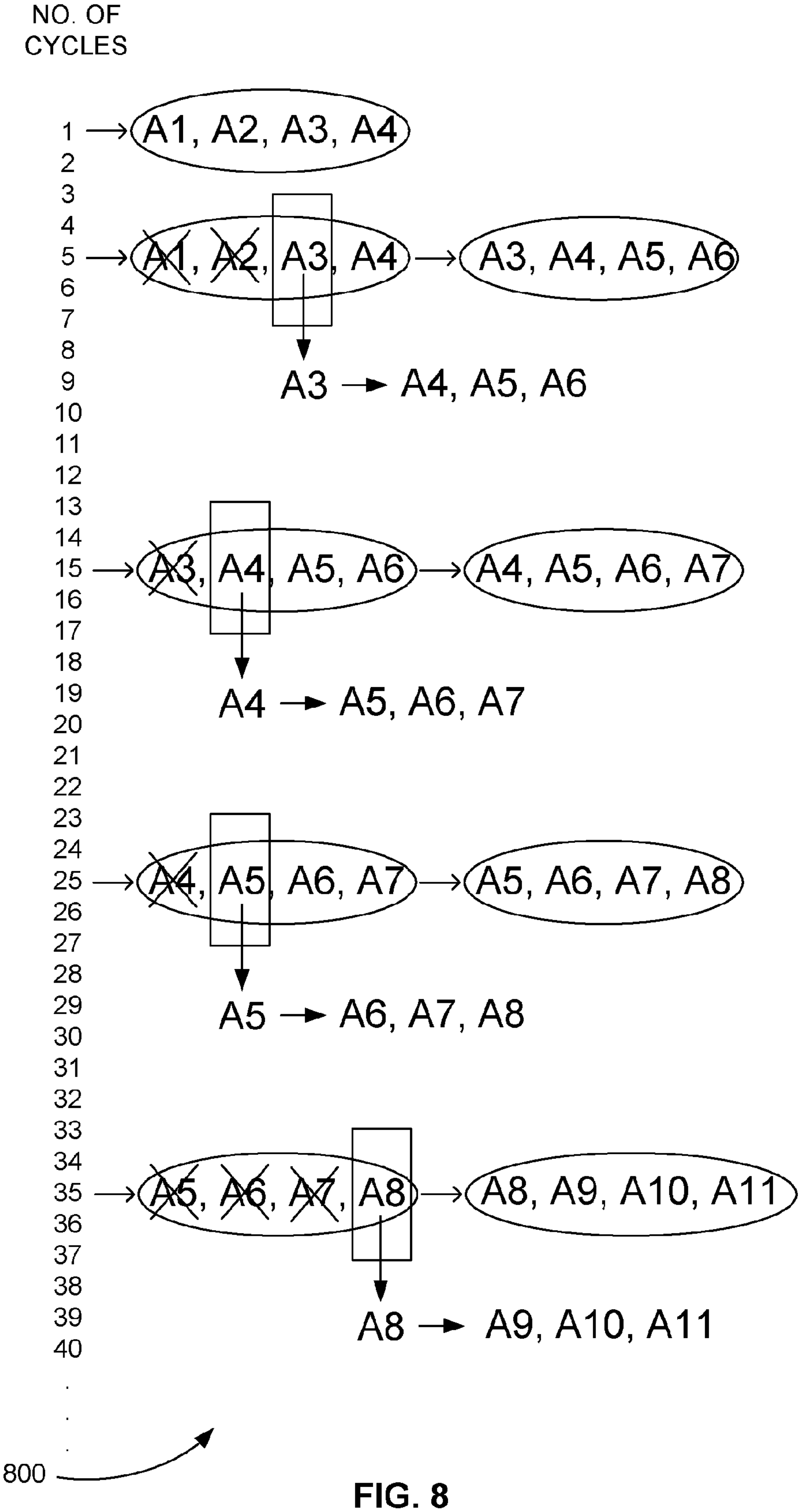
FIG. 8 is an exemplary diagram showing how precursor ion to product ion MRM transitions are added to and removed from a group of transitions as transitions are detected, in accordance with various embodiments.

FIG. 8 is an exemplary diagram 800 showing how precursor ion to product ion MRM transitions are added to and removed from a group of transitions as transitions are detected, in accordance with various embodiments. FIG. 8 shows a series of cycles for a mass spectrometer. During each cycle, each of the transitions in the group of transitions is executed or monitored. The group of transitions is enclosed in the ellipse shown in FIG. 8.

The group of transitions includes four transitions. Initially, the first four transitions corresponding to the first four samples ejected by the AEMS system are selected for the group of transitions. Therefore, in cycle 1, the group of transitions includes transitions A1, A2, A3, and A4.

At cycle 5, the product ion of transition A3 is detected above a certain threshold intensity. Transitions A1 and A2 are removed from the group. Each of the transitions of the group is a scout transition. As a result, transition A3 triggers transitions A4, A5, and A6. Transition A4 is already in the group, so only transitions A5 and A6 are added to the group replacing transitions A1 and A2.

Because transition A3 was detected before transitions A1 and A2, the samples corresponding to these transitions were either missing from their sample wells or their intensities were too low to be recorded. Using a group of transitions allows transition A3 to be detected even though transitions A1 and A2 are missing.

At cycle 15, the product ion of transition A4 is detected above a certain threshold intensity. Transition A3 is removed from the group. Transition A4 triggers transitions A5, A6, and A7. Transitions A5 and A6 are already in the group, so only transition A7 is added to the group replacing transition A3.

For the ten cycles between cycle 5 and cycle 15, as many as ten measurements for transition A3 may have been obtained. As a result, as many as 10 points may have been collected across an intensity versus time peak for the sample corresponding to transition A3, for example.

At cycle 25, the product ion of transition A5 is detected above a certain threshold intensity. Transition A4 is removed from the group. Transition A5 triggers transitions A6, A7, and A8. Transitions A6 and A7 are already in the group, so only transition A8 is added to the group replacing transition A4. Again, between cycle 15 and cycle 25, as many as 10 points may have been collected across an intensity versus time peak for the sample corresponding to transition A4, for example.

At cycle 35, the product ion of transition A8 is detected above a certain threshold intensity. Transitions A5, A6, and A7 are removed from the group. Transition A8 triggers transitions A9, A10, and A11, which are all added to the group replacing transitions A5, A6, and A7. Again, because transition A8 was detected before transitions A6 and A7, the samples corresponding to these transitions were either missing from their sample wells or their intensities were too low to be recorded.

In a second embodiment, a first sample and every mth sample following the first sample include marker compounds. Marker compounds are compounds provided at a concentration high enough to produce a known measured intensity. In other words, samples are provided with marker compounds to ensure that the samples are detected. As a result, scout transitions are only provided for the marker samples. Each marker transition then triggers the next m transitions.

Figure 9:
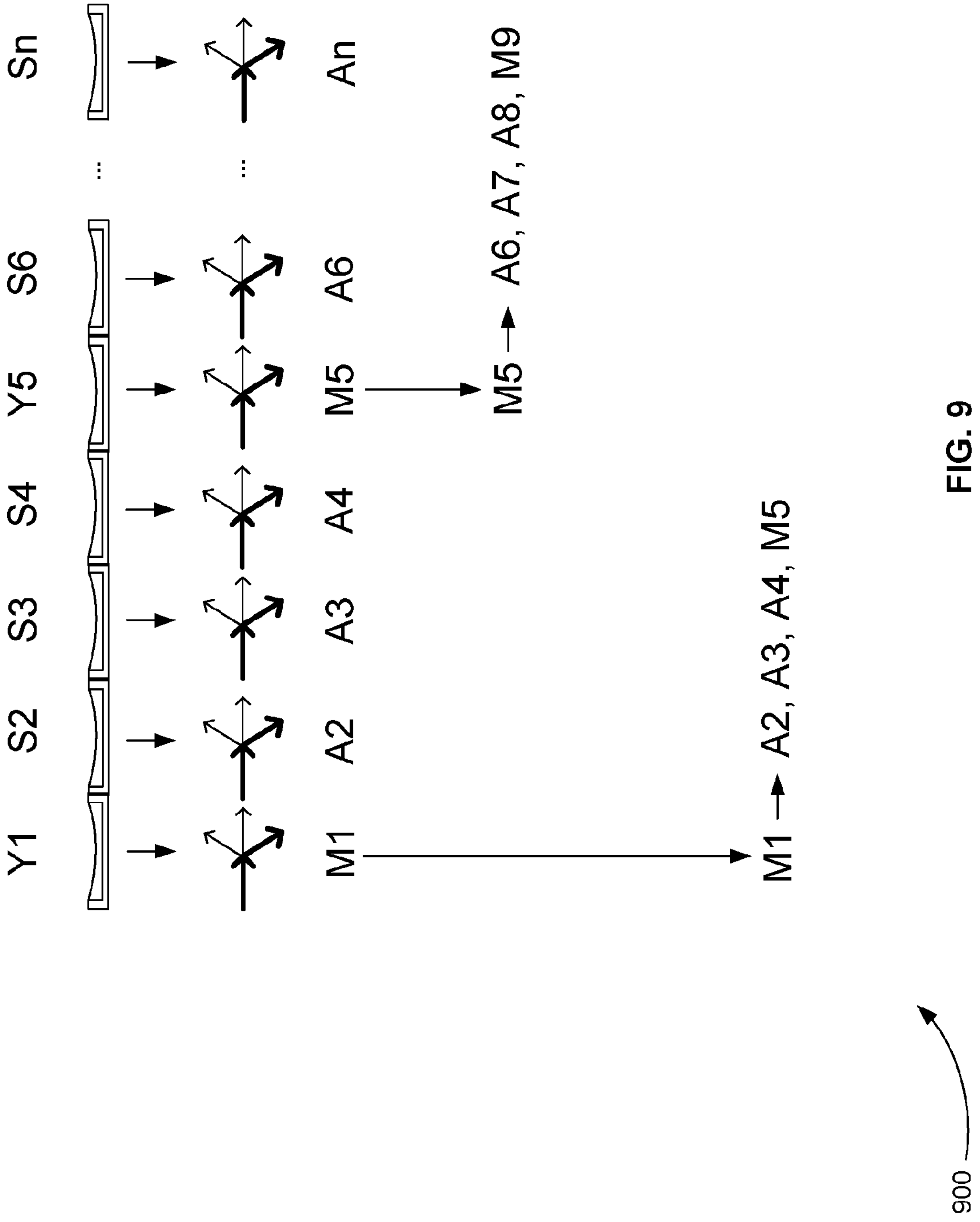
FIG. 9 is an exemplary diagram showing how MRM transitions that include a first marker transition and then another marker transition every m transitions after the first transition correspond to samples including corresponding marker samples of an AEMS experiment, in accordance with various embodiments.

FIG. 9 is an exemplary diagram 900 showing how MRM transitions that include a first marker transition and then another marker transition every m transitions after the first transition correspond to samples including corresponding marker samples of an AEMS experiment, in accordance with various embodiments. Specifically, transitions M1 to An correspond to samples Y1 to Sn. The first sample, Y1, and every mth sample following the first sample (every $4^{th}$ sample following Y1) include marker compounds, such as sample Y5. The first marker transition, M1, and then every m transitions after the first transition (every 4 transitions after M1) correspond to samples with one or more marker compounds.

Each marker transition, M1, M5, . . . , is a scout transition. Each marker transition triggers the following m transitions corresponding to the following samples in the sample order. For example, transition M1 triggers transitions A2, A3, A4, and M5 in FIG. 9. Transitions that are not marker transitions are not scout transitions. As a result, transitions A2, A3, and A4 do not trigger other transitions. Only marker transitions are scout transitions because they are known to produce a reliable measured signal.

FIG. 9 shows that if the product ion of marker transition M1 is detected above a certain intensity level, then marker transition M1 is detected. If marker transition M1 is detected, then transitions A2, A3, A4 and M5 are triggered. Note that each marker transition triggers another marker transition.

Again, triggered means, for example, adding the identified transitions to the group of transitions being executed. The detection of marker transition M1, for example, triggers its removal from the group of transitions being executed. After being detected above a certain intensity threshold, marker transitions, such as M1, can continue to be monitored but do not necessarily need continued monitoring since their primary function is to “mark” the location in the series of samples.

Figure 10:
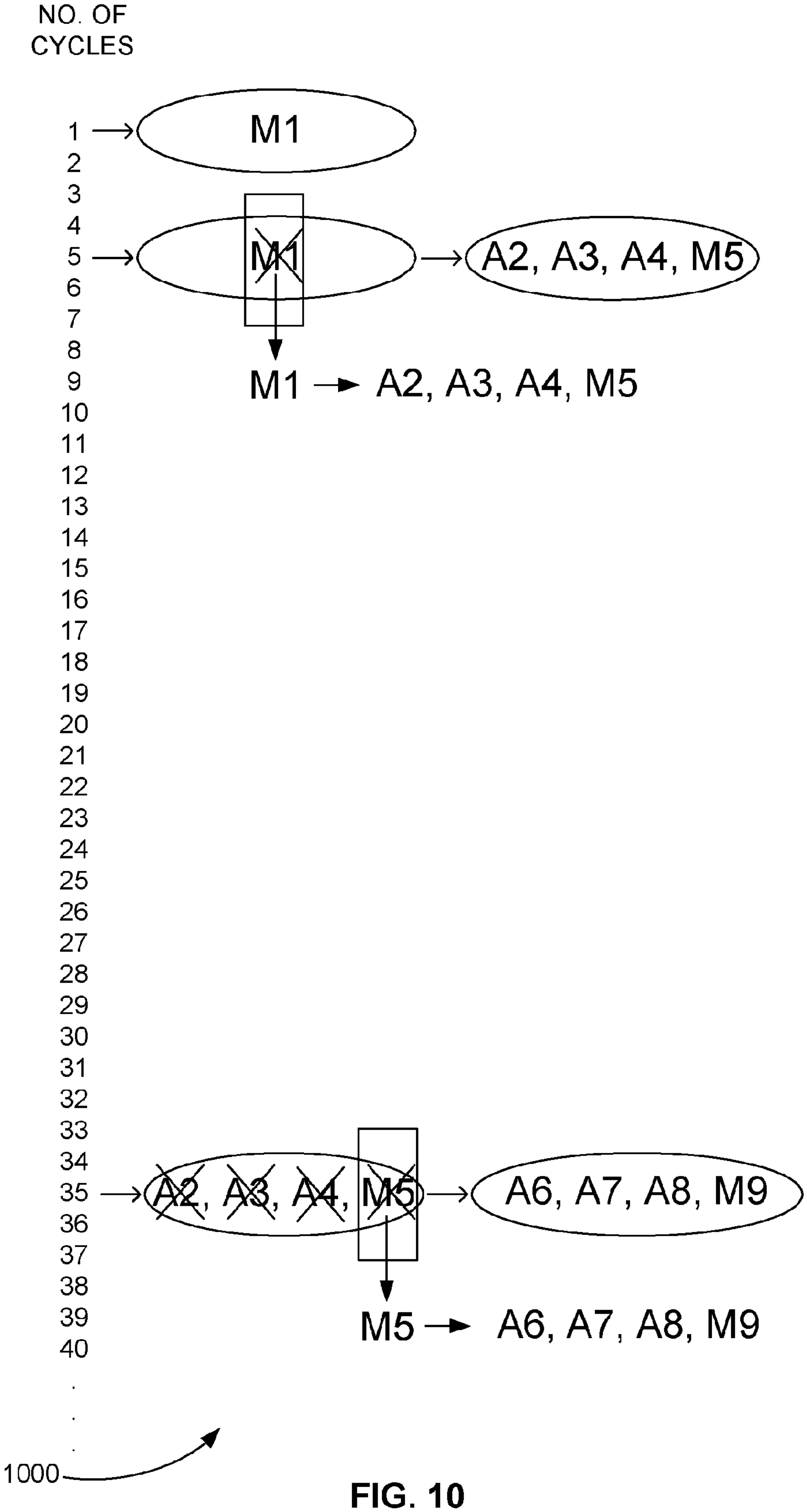
FIG. 10 is an exemplary diagram showing how MRM transitions that include marker transitions are added to and removed from a group of transitions as marker transitions are detected, in accordance with various embodiments.

FIG. 10 is an exemplary diagram 1000 showing how MRM transitions that include marker transitions are added to and removed from a group of transitions as marker transitions are detected, in accordance with various embodiments. FIG. 10 shows a series of cycles for a mass spectrometer. During each cycle, each of the transitions in the group of transitions is executed or monitored. The group of transitions is enclosed in the ellipse shown in FIG. 10.

The group of transitions can include four transitions, for example. Initially, only the first marker transition corresponding to the first sample, which includes one or more marker compounds, is selected for the group of transitions. In FIG. 10, therefore, the group of transitions initially only includes marker transition M1 at cycle 1.

At cycle 5, the product ion of marker transition M1 is detected above a certain threshold intensity. Marker transition M1 is removed from the group. Transition M1 is a scout transition. As a result, the detection of transition M1 triggers transitions A2, A3, A4, and M5. These transitions are, therefore, added to the group.

For the 30 cycles between cycle 5 and cycle 35, as many as ten measurements may have been obtained for each of transitions A2, A3, and A4. As a result, as many as 10 points may have been collected across an intensity versus time peak for the samples corresponding to transitions A2, A3, and A4, for example.

At cycle 35, the product ion of marker transition M5 is detected above a certain threshold intensity. Again, marker transition M5 is removed from the group. The detection of marker transition M5 triggers transitions A6, A7, A8, and M9. These transitions are, therefore, added to the group.

FIGS. 7-10 show different ways scout transitions and the sample order can be used to make sure that intensity versus time peaks are properly aligned with their corresponding samples. Scout transitions have been used before to eliminate the need for scheduled MRM transitions.

For example, U.S. Pat. No. 10,566,178 (hereinafter the “’178 patent”) describes using sentinel transitions to overcome the limitations of scheduled MRM. The ’178 patent provides that in scheduled MRM, each MRM transition defined in the workflow has a retention time associated it. Consequently, each MRM transition is monitored only around its retention time. Therefore, by scheduling the MRM transitions, the maximum number of transitions that are monitored at any point in time during an acquisition is optimized. In other words, not all MRM transitions need to be monitored for the entire acquisition time. This approach provides more data points across an elution peak and, therefore, better precision, sensitivity, and accuracy.

However, scheduled MRM has an important limitation. It is dependent on the accuracy and absolute value of the retention time used for each transition. Whenever the separation device changes or the gradient of separation changes, the retention time for each transition must be recomputed. This becomes particularly cumbersome when workflows include thousands of MRM transitions. This also makes it difficult to use scheduled MRM workflows across separation devices produced by different manufacturers that have different elution rates.

The ’178 patent provides systems and methods to limit the number of MRM transitions monitored at any one time without requiring the re-computation of retention time for each MRM transition, whenever the separation device changes or the gradient of separation changes. In these systems and methods, the MRM transitions to be used for an entire acquisition are ordered according to an expected retention time. The ordered MRM transitions are then divided into contiguous groups with different expected retention time ranges. In each group, at least one transition is selected as a sentinel transition. The sentinel transition in each group is used to identify the next group and trigger it for monitoring.

During acquisition, a first group of transitions is selected for monitoring. This is, for example, the group with the earliest expected retention time. When at least one sentinel transition in the first group is detected by the tandem mass spectrometer, the next group of transitions identified by the at least one sentinel transition is added to the list of transitions monitored by the tandem mass spectrometer. In other words, at least one sentinel transition in each group is used to trigger the transitions in the next contiguous group.

A group of transitions can also be removed from monitoring. For example, once at least one sentinel transition in the next contiguous group is detected, the transitions in the first group can be removed from monitoring.

As a result, by using sentinel transitions to trigger the addition and subtraction of MRM transitions from monitoring the overall number of MRM transitions being monitored at any one time is reduced. In addition, because the groups of transitions are not dependent on a specific retention time, workflows based on these systems and methods can be used without modification whenever the separation device changes or the gradient of separation changes.

In various embodiments, the systems and methods described herein provide a significant improvement over the '178 patent. For example, these systems and methods are directed to using the sample order rather than retention time ranges to reduce the number of MRM transitions monitored at any one time and to align intensity versus time mass peaks with samples.

In addition, the use of the sample order is such an important improvement that it also allows a modified form of scheduled MRM to be used with a different type of scout or sentinel transition that simply triggers scheduled MRM. In the third embodiment mentioned above, a group of transitions corresponding to the first few samples is monitored. Once a transition of the group is detected, the time between sample ejection and mass analysis is known from the detection time of the transition and the ejection time of its corresponding sample.

In an AEMS system, the time between sample ejections is extremely precise and, once it is known, the time between sample ejection and mass analysis does not significantly vary. As a result, after the detection of the time between sample ejection and mass analysis, the experiment can proceed using a single MRM transition corresponding to each next sample in the sample order. The scheduled time for each scheduled transition is then the sum of the time between sample ejection and mass analysis and the ejection time of each next sample.

Figure 11:
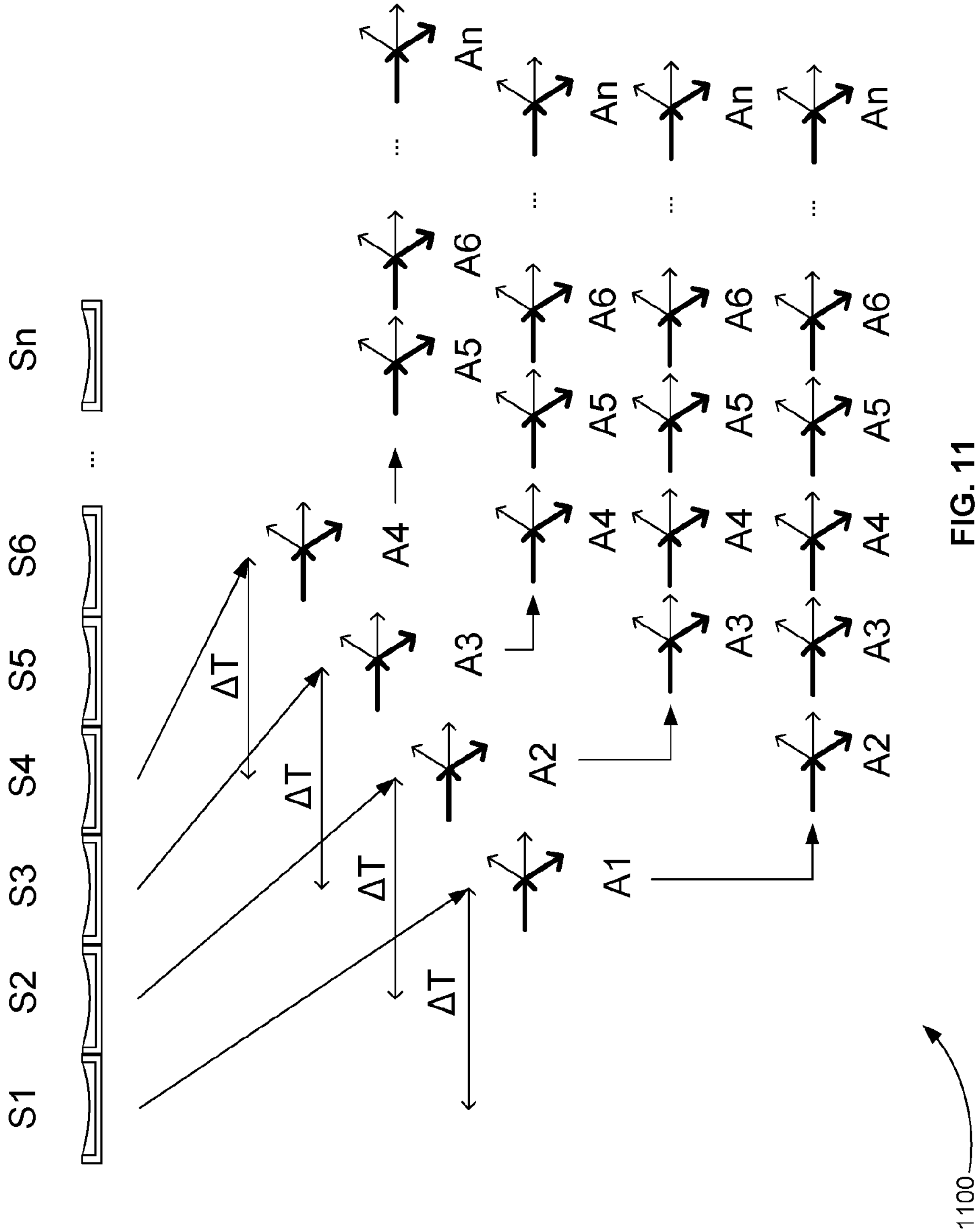
FIG. 11 is an exemplary diagram showing how a group of MRM transitions corresponding to the first few samples can trigger scheduled MRM of the remaining transitions corresponding to the remaining samples, in accordance with various embodiments.

FIG. 11 is an exemplary diagram 1100 showing how a group of MRM transitions corresponding to the first few samples can trigger scheduled MRM of the remaining transitions corresponding to the remaining samples, in accordance with various embodiments. Again, transitions A1 to An correspond to samples S1 to Sn. To begin, a group of m transitions corresponding to the first m samples of the sample order is selected. For example, in FIG. 11, four transitions, A1 to A4, corresponding to samples S1 to S4, are selected for the group of transitions.

The group of m transitions is then monitored. When a transition from the group is detected, the sample of the transition detected is identified. For example, in FIG. 11, if transition A3 is detected, then sample S3 is identified. The ejection time of sample S3 is known from the timing file, as described above. From the detection time of detected transition A3 and the ejection time of sample S3, the time between the ejection of a sample and the mass analysis of a product ion, ΔT, is calculated.

Once ΔT is determined, scheduled MRM for the remaining transitions corresponding to the remaining samples is triggered. For example, in FIG. 11, when transition A3 is detected, scheduled MRM is triggered for the remaining transitions A4 to An. The scheduled time for each scheduled transition is then the sum of ΔT and the ejection time of each next sample. For example, in FIG. 11, transition A4 is scheduled at a time equal to the sum of ΔT and the ejection time of sample S4.

Figure 12:
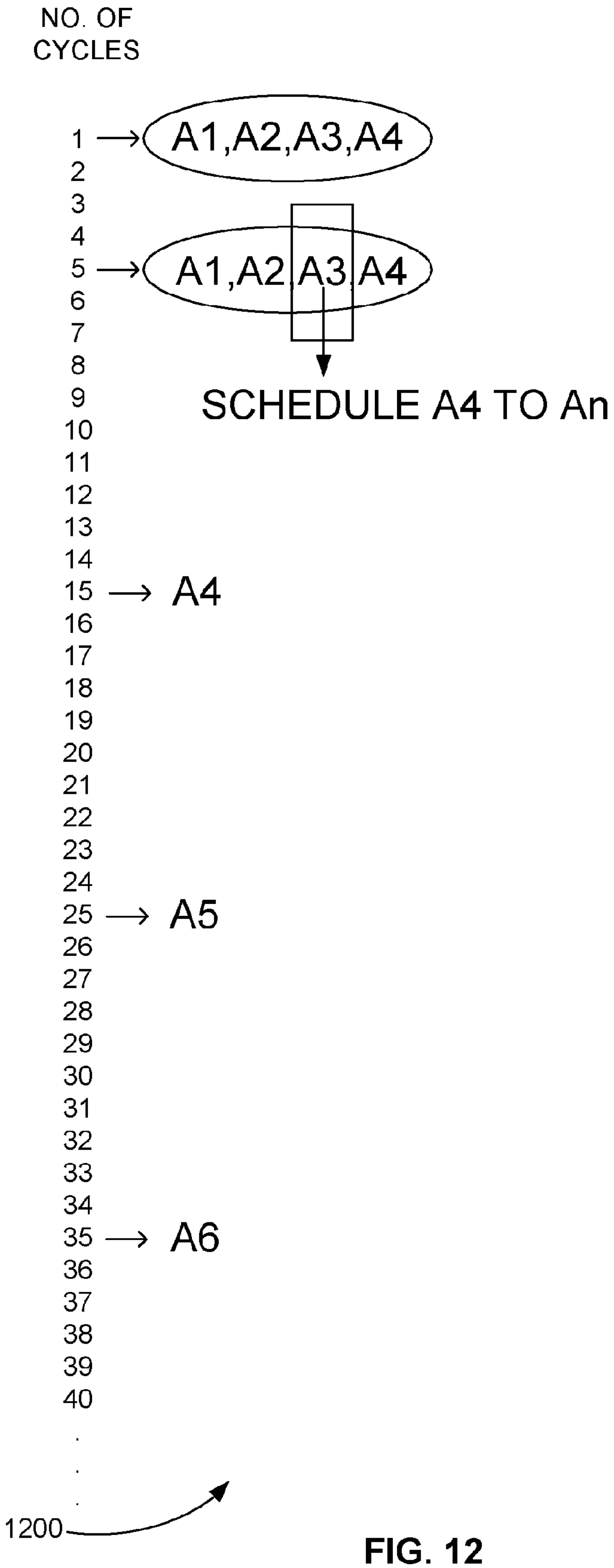
FIG. 12 is an exemplary diagram showing how scheduled MRM is triggered by a transition of a group of MRM transitions corresponding to the first few samples and how scheduled MRM proceeds on the remaining transitions corresponding to the remaining samples, in accordance with various embodiments.

FIG. 12 is an exemplary diagram 1200 showing how scheduled MRM is triggered by a transition of a group of MRM transitions corresponding to the first few samples and how scheduled MRM proceeds on the remaining transitions corresponding to the remaining samples, in accordance with various embodiments. Again, FIG. 12 shows a series of cycles for a mass spectrometer. During each initial cycle, each of the transitions in an initial group of transitions is executed or monitored. The group of transitions is enclosed in the ellipse shown in FIG. 12.

The group of transitions can include four transitions, for example. In this case, transitions A1 to A4 corresponding to the first four samples, S1 to S4, respectively, are selected for the group. As a result, at cycle 1, the group includes transitions A1 to A4. Each of these transitions is monitored at each cycle until a transition is detected.

At cycle 5, the product ion of transition A3 is detected above a certain threshold intensity. Like all transitions of the group, transition A3 triggers scheduled MRM for transitions corresponding to the remaining samples. For example, transition A4 is scheduled to be monitored between cycles 15 and 24, transition A5 is scheduled to be monitored between cycles 25 and 34, and transition A6 is scheduled to be monitored between cycles 35 and 44 as shown in FIG. 11.

Detected transition A3 continues to be monitored between cycles 6 and 14 in order to collect points across an intensity versus time peak for the sample corresponding to transition A3. In various embodiments, transition A3 may continue to be monitored along with other members of the group. In various alternative embodiments, the detection of transition A3 also triggers its scheduled monitoring. In other words, once transition A3 is detected, only transition A3 is monitored for a certain time period or number of cycles.

Note that the time period or number of cycles during which the transition is monitored using scheduled MRM is determined from the time between sample ejections. Again, this time is known from the timing file provided by the ADE device.

Although the above embodiments have been described in relation to AEMS, these embodiments are not limited to AEMS. For example, these embodiments can be equally applied to any system or method for selecting MRM transitions using any sample introduction system coupled to a mass spectrometer that ejects samples in a known sample order, records the sample ejection times of the ejections performed by the sample introduction system, and has a consistent delay time from ejection to mass analysis.

System for Selecting the Next MRM Transitions

Figure 13:
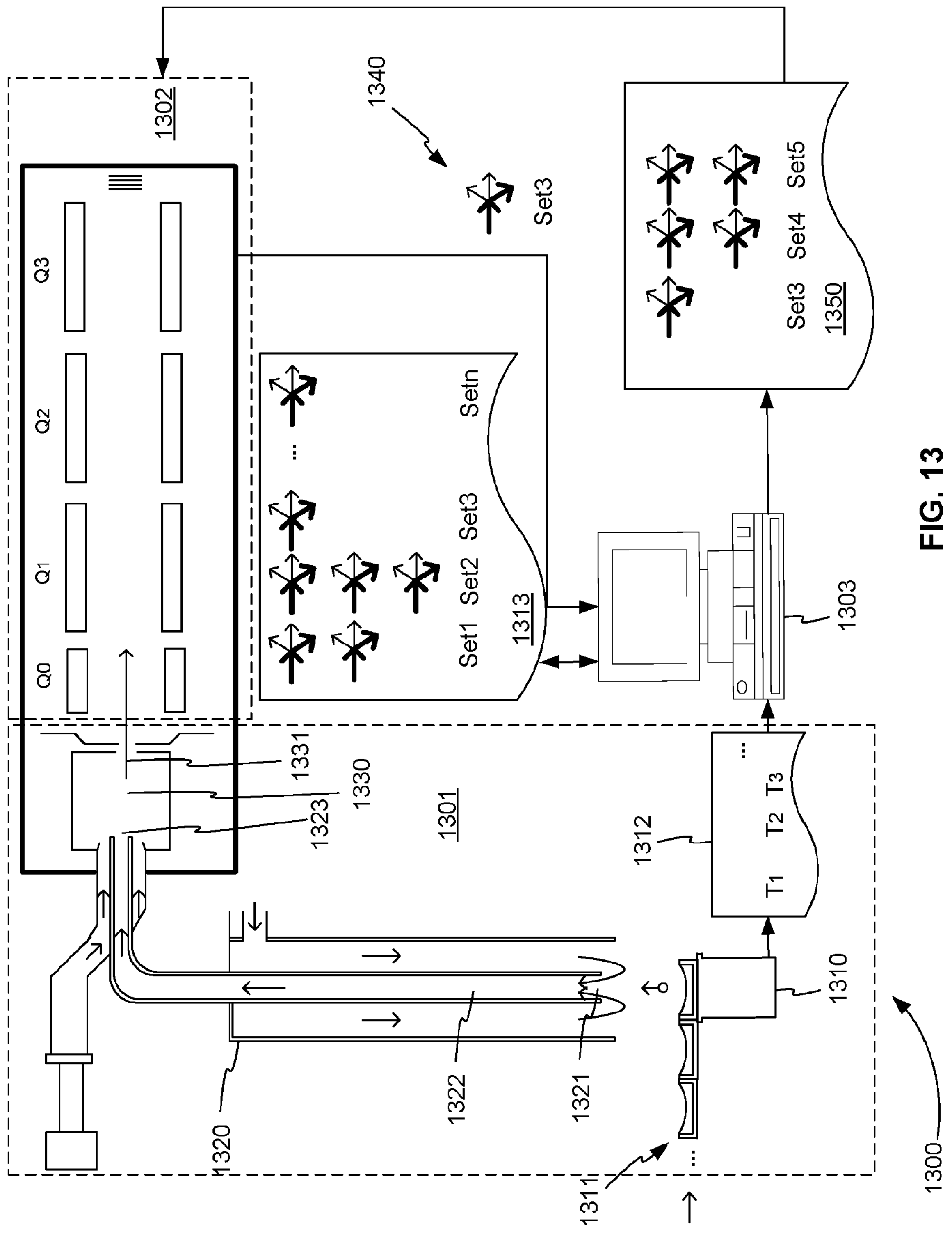
FIG. 13 is a schematic diagram of a system for selecting the next MRM transitions to be monitored in a high-throughput sample introduction coupled mass spectrometry experiment based on the transition detected and the order of the samples, in accordance with various embodiments.

FIG. 13 is a schematic diagram 1300 of a system for selecting the next MRM transitions to be monitored in a high-throughput sample introduction coupled mass spectrometry experiment based on the transition detected and the order of the samples, in accordance with various embodiments. The system of FIG. 13 includes sample introduction system 1301, tandem mass spectrometer 1302 (e.g. triple quadrupole mass spectrometer), and processor 1303.

Sample introduction system 1301 ejects each sample of a series of samples 1311 at an ejection time and according to a sample order. A plurality of ejection times 1312 corresponding to series of samples 1311 is produced. Sample introduction system 1301 also ionizes each ejected sample of series of samples 1311, producing an ion beam 1331. Tandem mass spectrometer 1302 receives ion beam 1331.

Processor 1303 receives a list 1313 of different sets of one or more MRM precursor ion to product ion transitions. For example, Set1 of list 1313 includes two MRM transitions, Set2 includes three MRM transitions, and Set3 includes one MRM transition. Each set of list 1313 corresponds to a different sample of series 1311. Processor 1303 selects a group of one or more different sets from list 1313. Initially, each set transition selected for the group corresponds to a different sample of one or more first samples of series 1311.

Processor 1303 instructs tandem mass spectrometer 1302 to execute each transition of each set of the group on ion beam 1331 during each cycle of a plurality of cycles until a transition of the group is detected. For each transition of each set of the group, tandem mass spectrometer 1302 selects and fragments a precursor ion of each transition and mass analyzes a small mass-to-charge ratio (m/z) range around the m/z of a product ion of each transition to determine if the product ion of each transition is detected. When a transition 1340 of a set of the group is detected, processor 1303 selects one or more next sets 1350 from list 1313 to be monitored using detected transition 1340 and the sample order of series 1311.

In various embodiment, each set of list 1313 includes a single transition. In other words, each set is equivalent to one transition as is shown in FIGS. 7-12.

In various embodiments, the sample order is the order in which samples are ejected ejected from their sample wells into sample introduction system 1301.

In various embodiments, one or more next sets 1350 are selected from list 1313 using scout transitions, such as those described in regard to FIGS. 7-8. Specifically, list 1313 is ordered according to the sample order of series 1311. Each transition of each set of list 1313 is a scout transition that identifies one or more sets immediately following the set of the scout transition on list 1313. When a transition 1340 of a set of the group is detected, processor 1303 selects one or more next sets 1350 by selecting one or more sets identified by detected transition 1340 as immediately following the set of detected transition 1340 in list 1313.

In various embodiments, processor 1303 further adds the selected one or more sets to the group if any are not already part of the group. In addition, processor 1303 instructs tandem mass spectrometer 1302 to execute each transition of each set of the group on ion beam 1331 during each cycle of a plurality of cycles until a different transition of the group is detected.

In various embodiments, processor 1303 further removes any set of the group that precedes the set of detected transition 1340 on list 1313. This removal takes place before processor 1303 instructs tandem mass spectrometer 1302 to execute each transition of each set of the group on ion beam 1331 during each cycle of a plurality of cycles until a transition of a different set of the group is detected.

In various embodiments, one or more next sets 1350 are selected from list 1313 using marker transitions that are scout transitions, such as those described in regard to FIGS. 9-10. List 1313 is ordered according to the sample order of series 1311. A first set of list 1313 and every mth set following the first set are marker sets for samples that include marker ions. Every marker set includes one or more scout transitions that identify m set immediately following every marker set on list 1313. Processor 1303 initially selects only the first set for the group. When a transition 1340 of a set of the group is detected, processor 1303 selects one or more next set 1350 by selecting m sets identified by the detected marker transition.

In various embodiments, processor 1303 further performs a number of steps. A. Processor 1303 removes all sets from the group. B. Processor 1303 adds m sets identified by the detected marker transition to the group. C. Processor 1303 further instructs tandem mass spectrometer 1302 to execute each transition of each set of the group on ion beam 1331 during each cycle of a plurality of cycles until a marker transition of a set of the group is detected. Processor 1303 repeats steps A-C until all sets of list 1313 have been added to the group.

In various embodiments, one or more next sets 1350 are selected from list 1313 using transitions that trigger scheduled MRM, such as those described in regard to FIGS. 11-12. When a transition 1340 of a set of the group is detected, processor 1303 selects one or more next set 1350 from list 1313 to be monitored by first identifying a corresponding sample from the set of detected transition 1340. Next, processor 1303 identifies a plurality of next samples of series 1311 following the identified corresponding sample using the sample order of series 1311. Finally, processor 1303 selects a plurality of sets of list 1313 corresponding to the plurality of next samples as one or more next sets 1350.

In various embodiments, processor 1303 further instructs tandem mass spectrometer 1302 to schedule execution of each transition of each set of the plurality of sets based on an ejection time of a sample corresponding to each set, an ejection time of the corresponding sample from detected transition 1340, a detection time of detected transition 1340, and the sample order of series 1311.

In various embodiments, sample introduction system 1301 includes a surface analysis system. In various embodiments, the surface analysis system can be, but is not limited to, a matrix-assisted laser desorption/ionization WALDO device or a laser diode thermal desorption (LDTD) device.

In various embodiments, sample introduction system 1301 includes a flow injection device and an ion source device. For example, the flow injection device can be a timed valve device that injects sample into a flowing stream through a valve at each ejection time of plurality of ejection times 1312 and the ion source device ionizes samples of the flowing stream, producing ion beam 1331.

In various embodiments, the flow injection device can be a droplet dispenser that ejects series of samples 1311 as droplets into a flowing stream at each ejection time of plurality of ejection times 1312 and the ion source device ionizes samples of the flowing stream, producing ion beam 1331.

In various embodiments, and as shown in FIG. 13, the droplet dispenser includes ADE device 1310 that ejects series of samples 1311 as droplets into inlet 1321 of tube 1322 of OPI 1320. OPI 1320 OPI mixes the droplets of series of samples 1311 with a solvent in tube 1322 to form a series of analyte-solvent dilutions. OPI 1320 transfers the series of dilutions to outlet 1323 of tube 1322 of OPI 1320. Ion source device 1330 receives the series of dilutions and ionizes samples of the series of dilutions, producing ion beam 1331. Ion source device 1330 can be an electrospray ion source (ESI) device, for example. Ion source device 1330 is shown as part of tandem mass spectrometer 1302 in FIG. 13 but can be a separate device also.

Tandem mass spectrometer 1302 can be any type of mass spectrometer. Tandem mass spectrometer 1302 is shown as being a triple quadrupole mass analyzer, but tandem mass spectrometer 1302 can include any type of mass analyzer including for example a time-of-flight (ToF) mass analyzer.

In various embodiments, processor 1303 is used to send and receive instructions, control signals, and data to and from sample introduction system 1301 and tandem mass spectrometer 1302. Processor 1303 controls or provides instructions by, for example, controlling one or more voltage, current, or pressure sources (not shown). Processor 1303 can be a separate device as shown in FIG. 13 or can be a processor or controller of sample introduction system 1301 or tandem mass spectrometer 1302. Processor 1303 can be, but is not limited to, a controller, a computer, a microprocessor, the computer system of FIG. 2, or any device capable of sending and receiving control signals and data and analyzing data.

Note that terms "eject," "ejection," "ejection times," and the like are used throughout this written description in reference to a sample introduction system. One of ordinary skill in the art can appreciate that other terms can also be used to describe the movement of sample from the sample introduction system, such as, but not limited to, terms like "inject," "injection," and "injection times."

Method for Selecting the Next MRM Transitions

Figure 14:
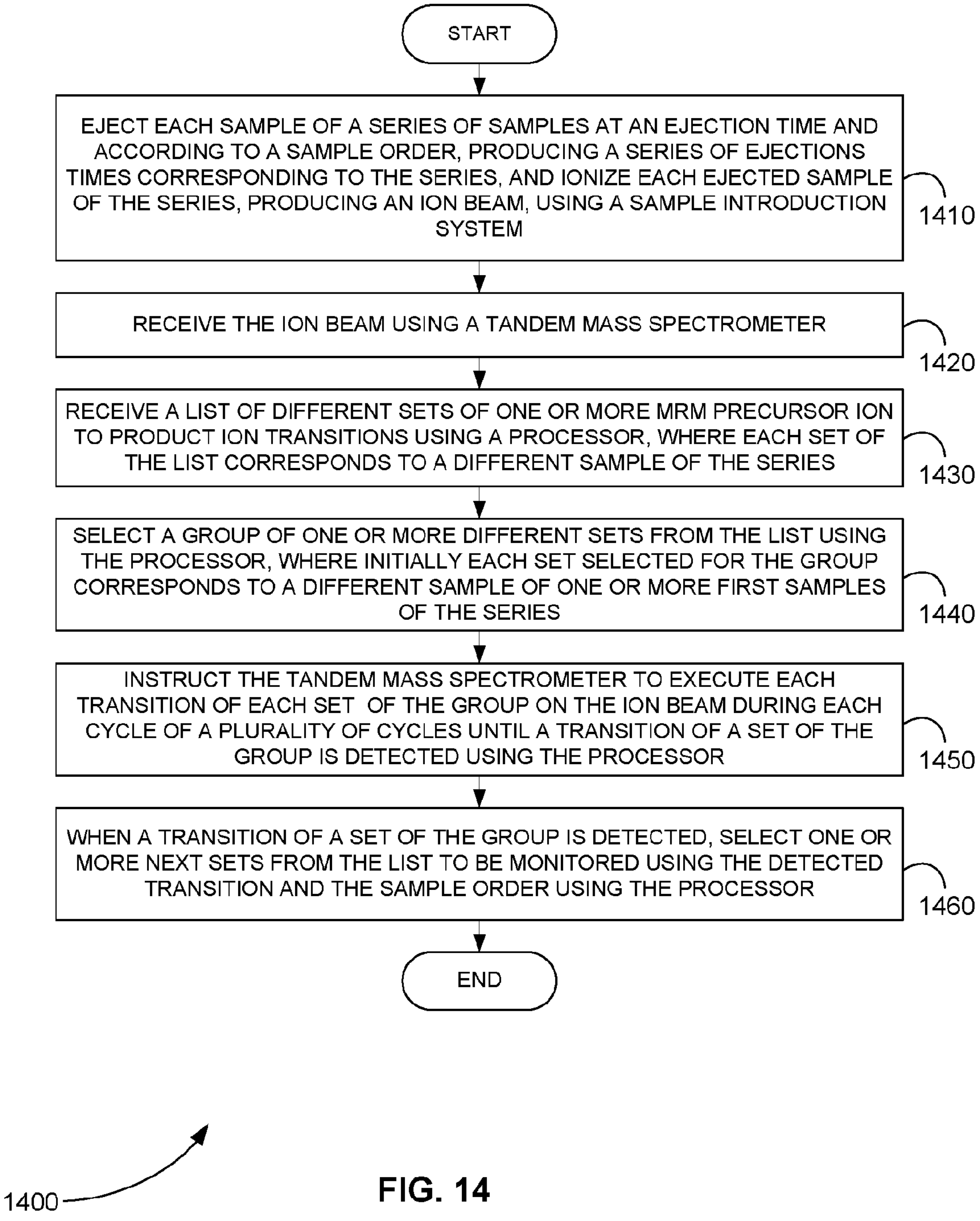
FIG. 14 is a flowchart showing a method for selecting the next MRM transitions to be monitored in a high-throughput sample introduction coupled mass spectrometry experiment based on the transition detected and the order of the samples, in accordance with various embodiments.

FIG. 14 is a flowchart showing a method 1400 for selecting the next MRM transitions to be monitored in a high-throughput sample introduction coupled mass spectrometry experiment based on the transition detected and the order of the samples, in accordance with various embodiments.

In step 1410 of method 1400, each sample of a series of samples is ejected at an ejection time and according to a sample order using a sample introduction system. A plurality of ejection times corresponding to the series is produced. Each ejected sample of the series is ionized using the sample introduction system, producing an ion beam.

In step 1420, the ion beam is received using a tandem mass spectrometer.

In step 1430, a list of different sets of one or more MRM precursor ion to product ion transitions is received using a processor. Each transition of the list corresponds to a different sample of the series.

In step 1440, a group of one or more different sets is selected from the list using the processor. Initially, each set transition selected for the group corresponds to a different sample of one or more first samples of the series.

In step 1450, the tandem mass spectrometer is instructed to execute each transition of each set of the group on the ion beam during each cycle of a plurality of cycles until a transition of a set of the group is detected using the processor.

In step 1460, when a transition of a set of the group is detected, one or more next sets are selected from the list to be monitored using the detected transition and the sample order using the processor.

Computer Program Product for Selecting the Next MRM Transitions

In various embodiments, computer program products include a tangible computer-readable storage medium whose contents include a program with instructions being executed on a processor so as to perform a method for selecting the next MRM transitions to be monitored in a high-throughput sample introduction coupled mass spectrometry experiment based on the transition detected and the order of the samples. This method is performed by a system that includes one or more distinct software modules.

Figure 15:
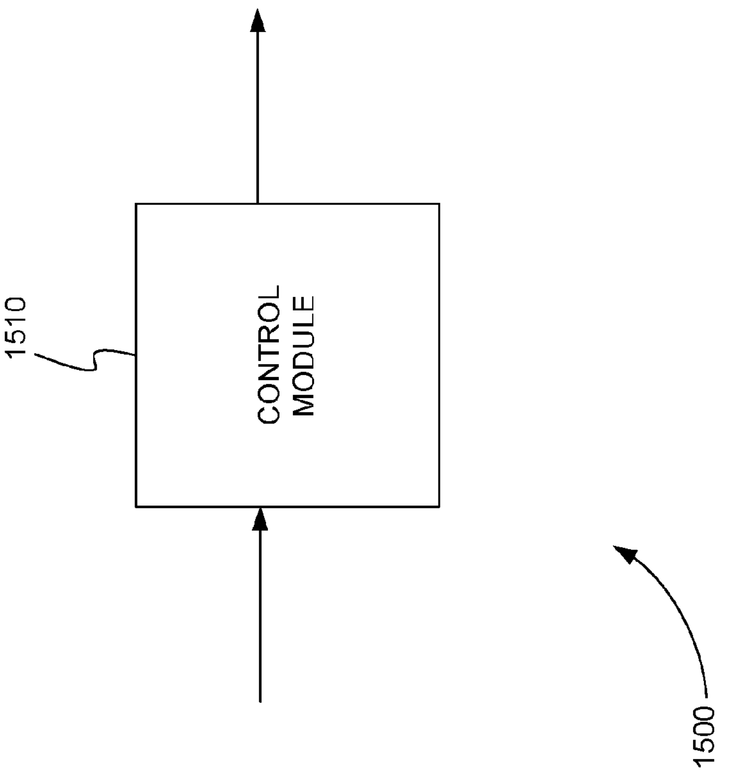
FIG. 15 is a schematic diagram of a system that includes one or more distinct software modules that performs a method for selecting the next MRM transitions to be monitored in a high-throughput sample introduction coupled mass spectrometry experiment based on the transition detected and the order of the samples, in accordance with various embodiments.

FIG. 15 is a schematic diagram of a system 1500 that includes one or more distinct software modules that performs a method for selecting the next MRM transitions to be monitored in a high-throughput sample introduction coupled mass spectrometry experiment based on the transition detected and the order of the samples, in accordance with various embodiments. System 1500 includes control module 1510.

Control module 1510 instructs a sample introduction system to eject each sample of a series of samples at an ejection time and according to a sample order. A plurality of ejection times corresponding to the series is produced. Control module 1510 also instructs a sample introduction system to ionize each ejected sample of the series, producing an ion beam. Control module 1510 instructs a tandem mass spectrometer to receive the ion beam.

Control module 1510 receives a list of different sets of one or more MRM precursor ion to product ion transitions. Each transition of the list corresponds to a different sample of the series. Control module 1510 selects a group of one or more sets from the list. Initially, each set transition selected for the group corresponds to a different sample of one or more first samples of the series.

Control module 1510 instructs the tandem mass spectrometer to execute each transition of each set of the group on the ion beam during each cycle of a plurality of cycles until a transition of a set of the group is detected. When a transition of a set of the group is detected, control module 1510 selects one or more next sets from the list to be monitored using the detected transition and the sample order.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for selecting the next multiple reaction monitoring (MRM) transitions to be monitored in a high-throughput sample introduction coupled mass spectrometry experiment based on the transition detected and the order of the samples, comprising:

- a sample introduction system that ejects each sample of a series of samples at an ejection time and according to a sample order, producing a plurality of ejection times corresponding to the series, and ionizes each ejected sample of the series, producing an ion beam;

a tandem mass spectrometer that receives the ion beam; and a processor that receives a list of different sets of one or more MRM precursor ion to product ion transitions, wherein each set of the list corresponds to a different sample of the series, selects a group of one or more sets from the list, wherein initially each of one or more sets selected for the group corresponds to a different sample of one or more first samples of the series, instructs the tandem mass spectrometer to execute each transition of each set of the group on the ion beam during each cycle of a plurality of cycles until a transition of a set of the group is detected, and when a transition of a set of the group is detected, selects one or more next sets from the list to be monitored using the detected transition and the sample order.

2. The system of claim 1, wherein the list is ordered according to the sample order, wherein each transition of each set of the list is a scout transition that identifies one or more sets immediately following the each set on the list, and wherein, when a transition of a set of the group is detected, the processor selects the one or more next sets by selecting one or more sets of the list identified by the detected transition as immediately following the set of the detected transition.

3. The system of claim 2, wherein the processor further adds the selected one or more sets to the group if any are not already part of the group and instructs the tandem mass spectrometer to execute each transition of each set of the group each transition of each set of the group on the ion beam during each cycle of a plurality of cycles until a transition of a different set of the group is detected.

4. The system of claim 3, wherein the processor further removes any set of the group that precedes a set of the detected transition on the list before the processor instructs the tandem mass spectrometer to execute each transition of each set of the group each transition of each set of the group on the ion beam during each cycle of a plurality of cycles until a transition of a different set of the group is detected.

5. The system of claim 1, wherein the list is ordered according to the sample order, wherein a first set of the list and every mth set following the first set are marker sets for samples that include marker ions, wherein every marker set includes one or more scout transitions that identify m sets immediately following every marker set on the list, wherein the processor initially selects only the first set for the group, wherein, when a transition of a set of the group is detected, the processor selects the one or more next sets by selecting m sets identified by the detected marker transition.

6. The system of claim 5, wherein the processor further (a) removes all sets from the group, (b) adds m sets identified by the detected marker transition to the group, (c) instructs the tandem mass spectrometer to execute each transition of each set of the group on the ion beam during each cycle of a plurality of cycles until a marker transition of a set of the group is detected, and (d) repeats steps (a)-(c) until all sets of the list have been added to the group.

7. The system of claim 1, wherein, when a transition of a set of the group is detected, the processor selects one or more next sets from the list to be monitored by identifying a corresponding sample from the set of the detected transition and identifying a plurality of next samples of the series following the identified corresponding sample using the sample order, and selecting a plurality of sets of the list corresponding to the plurality of next samples as the one or more next sets and wherein the processor further instructs the tandem mass spectrometer to schedule execution of each transition of each set of the plurality of sets based on an ejection time of a sample corresponding to the each set, an ejection time of the corresponding sample from the detected transition, a detection time of the detected transition, and the sample order.

8. The system of claim 1, wherein the sample introduction system comprises a surface analysis system.

9. The system of claim 8, wherein the surface analysis system comprises one of a matrix-assisted laser desorption/ionization (MALDI) device or a laser diode thermal desorption (LDTD) device.

10. The system of claim 1, wherein the sample introduction system comprises a flow injection device and an ion source device.

11. The system of claim 10, wherein the flow injection device comprises a timed valve device that injects sample into a flowing stream through a valve at each ejection time of the plurality of ejection times and wherein the ion source device ionizes samples of the flowing stream, producing the ion beam.

12. The system of claim 10, wherein the flow injection device comprises a droplet dispenser that ejects the series of samples as droplets into a flowing stream at each ejection time of the plurality of ejection times and wherein the ion source device ionizes samples of the flowing stream, producing the ion beam.

13. The system of claim 12, wherein the droplet dispenser comprises an acoustic droplet ejection (ADE) device that ejects the series of samples as droplets into an inlet of a tube of an open port interface (OPI), wherein the OPI mixes the droplets of the series of samples with a solvent in the tube to form a series of analyte-solvent dilutions and transfers the series of dilutions to an outlet of the tube of the OPI, and wherein the ion source device receives the series of dilutions and ionizes samples of the series of dilutions, producing the ion beam.

14. A method for selecting the next multiple reaction monitoring (MRM) transitions to be monitored in a high-throughput sample introduction coupled mass spectrometry experiment based on the transition detected and the order of the samples, comprising:

ejecting each sample of a series of samples at an ejection time and according to a sample order, producing a plurality of ejection times corresponding to the series, and ionizing each ejected sample of the series, producing an ion beam, using a sample introduction system;

receiving the ion beam using a tandem mass spectrometer;

receiving a list of different sets of one or more MRM precursor ion to product ion transitions using a processor, wherein each set of the list corresponds to a different sample of the series;

selecting a group of one or more sets from the list using the processor, wherein initially each of one or more sets selected for the group corresponds to a different sample of one or more first samples of the series;

instructing the tandem mass spectrometer to execute each transition of each set of the group on the ion beam during each cycle of a plurality of cycles until a transition of a set of the group is detected using the processor; and when a transition of a set of the group is detected, selecting one or more next sets from the list to be monitored using the detected transition and the sample order using the processor.

15. A computer program product, comprising a non-transitory and tangible computer-readable storage medium whose contents include a program with instructions being executed on a processor so as to perform a method for selecting the next multiple reaction monitoring (MRM) transitions to be monitored in a high-throughput sample introduction coupled mass spectrometry experiment based on the transition detected and the order of the samples, the method comprising:

providing a system, wherein the system comprises one or more distinct software modules, and wherein the distinct software modules comprise a control module;

instructing a sample introduction system to eject each sample of a series of samples at an ejection time and according to a sample order, producing a plurality of ejection times corresponding to the series, and ionize each ejected sample of the series, producing an ion beam, using the control module;

instructing a tandem mass spectrometer to receive the ion beam using the control module;

receiving a list of different sets of one or more MRM precursor ion to product ion transitions using the control module, wherein each set of the list corresponds to a different sample of the series;

selecting a group of one or more sets from the list using the control module, wherein initially each of one or more sets selected for the group corresponds to a different sample of one or more first samples of the series;

instructing the tandem mass spectrometer to execute each transition of each set of the group on the ion beam during each cycle of a plurality of cycles until a transition of a set of the group is detected using the control module; and when a transition of a set of the group is detected, selecting one or more next sets from the list to be monitored using the detected transition and the sample order using the control module.

* * * * *